(12) United States Patent
Yu et al.

(10) Patent No.: US 9,277,555 B2
(45) Date of Patent: Mar. 1, 2016

(54) APPARATUS AND METHOD FOR TRANSMITTING/RECEIVING DATA IN COMMUNICATION SYSTEM

(71) Applicant: Electronics and Telecommunications Research Institute, Daejeon (KR)

(72) Inventors: Hee-Jung Yu, Daejeon (KR); Min-Ho Cheong, Daejeon (KR); Sok-Kyu Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 93 days.

(21) Appl. No.: 13/652,412

(22) Filed: Oct. 15, 2012

(65) Prior Publication Data

US 2013/0136075 A1    May 30, 2013

(30) Foreign Application Priority Data

Oct. 13, 2011 (KR) .......................... 10-2011-0104867
Dec. 5, 2011 (KR) .......................... 10-2011-0128828
Oct. 12, 2012 (KR) .......................... 10-2012-0113674

(51) Int. Cl.
*H04W 72/04* (2009.01)
*H04L 1/00* (2006.01)
*H04L 1/06* (2006.01)

(52) U.S. Cl.
CPC .......... *H04W 72/0453* (2013.01); *H04L 1/0026* (2013.01); *H04L 1/0643* (2013.01); *H04L 1/0061* (2013.01)

(58) Field of Classification Search
CPC .................................................. H04W 72/0453
USPC ........................................ 370/329, 341, 322
See application file for complete search history.

(56) References Cited

U.S. PATENT DOCUMENTS

2011/0135016 A1    6/2011    Ahn et al.

FOREIGN PATENT DOCUMENTS

KR    10-2010-0017049 A    2/2010

*Primary Examiner* — Dang Ton
*Assistant Examiner* — Pamit Kaur

(57) ABSTRACT

A data transmission apparatus in a communication system includes a verification unit configured to verify a basic frequency band capable of being used for transmitting and receiving data to and from a plurality of terminals, and a multi-bandwidth mode in the basic frequency band; a generation unit configured to generate data packets in the multi-bandwidth mode; and a transmission unit configured to transmit the data packets in the multi-bandwidth mode, wherein the multi-bandwidth mode includes a ½× bandwidth of the basic frequency band, a basic bandwidth, a 2× bandwidth of the basic frequency band, a 4× bandwidth of the basic frequency band and an 8× bandwidth of the basic frequency band.

20 Claims, 12 Drawing Sheets

APPARATUS AND METHOD FOR TRANSMITTING/RECEIVING DATA IN COMMUNICATION SYSTEM

CROSS-REFERENCES TO RELATED APPLICATIONS

The present application claims priorities of Korean Patent Application Nos. 10-2011-0104867, 10-2011-0128828, and 10-2012-0113674, filed on Oct. 13, 2011, Dec. 5, 2011, and Oct. 12, 2012, respectively, which are incorporated herein by reference in their entireties.

BACKGROUND OF THE INVENTION

1. Field of the Invention

Exemplary embodiments of the present invention relate to a communication system, and, more particularly, to an apparatus and a method for transmitting and receiving data in a communication system, in which a frame is configured to support a multi-bandwidth in a new frequency band and data are transmitted and received through the configured frame.

2. Description of Related Art

In a current communication system, research for providing various qualities of service (hereinafter, referred to as 'QoS') to users at a high transmission rate has been actively conducted. In a wireless local area network (hereinafter, referred to as 'WLAN') system as an example of such a communication system, research for methods for stably transmitting large data at a high speed through limited resources has been actively conducted. In particular, in a communication system, research for data transmission through wireless channels has been conducted. Recently, methods for the WLAN system to normally transmit and receive large data by effectively using limited wireless channels have been suggested.

Meanwhile, in a current communication system, in order to efficiently transmit larger capacity data, research for a new frequency band different from a frequency band used for data transmission and reception in an existing communication system has been conducted. In particular, research for data transmission and reception in such a new frequency band has been conducted.

However, in the current communication system, no concrete method for transmitting and receiving data in a new frequency band different from an existing frequency band has been suggested. In particular, no concrete method for a frame for transmitting and receiving data in a new frequency band and no concrete method for a frame for supporting a multi-bandwidth in the new frequency band have been suggested.

As a consequence, in order to stably transmit and receive data at a high speed through a new frequency band in a communication system, for example, a WLAN system, methods for configuring a frame in a new frequency band and a frame for supporting a multi-bandwidth in the new frequency band and normally transmitting and receiving data through the new frequency band by using the frame configured in this way are demanded in the art.

SUMMARY OF THE INVENTION

Embodiments of the present invention are directed to an apparatus and a method for transmitting and receiving data in a communication system.

Other embodiments of the present invention are directed to an apparatus and a method for configuring a frame in a new frequency band and stably transmitting and receiving data at a high speed in a communication system.

Other embodiments of the present invention are directed to an apparatus and a method for configuring a frame capable of supporting a multi-bandwidth in a new frequency band and normally transmitting and receiving data in a communication system.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, a data transmission apparatus in a communication system includes: a verification unit configured to verify a basic frequency band capable of being used for transmitting and receiving data to and from a plurality of terminals, and a multi-bandwidth mode in the basic frequency band; a generation unit configured to generate data packets in the multi-bandwidth mode; and a transmission unit configured to transmit the data packets in the multi-bandwidth mode, wherein the multi-bandwidth mode includes a ½× bandwidth of the basic frequency band, a basic bandwidth, a 2× bandwidth of the basic frequency band, a 4× bandwidth of the basic frequency band and an 8× bandwidth of the basic frequency band.

In accordance with another embodiment of the present invention, a data transmitting method in a communication system includes: verifying a basic frequency band capable of being used for transmitting and receiving data to and from a plurality of terminals, and a multi-bandwidth mode in the basic frequency band; generating data packets in the multi-bandwidth mode; and transmitting the data packets in the multi-bandwidth mode, wherein the multi-bandwidth mode includes a ½× bandwidth of the basic frequency band, a basic bandwidth, a 2× bandwidth of the basic frequency band, a 4× bandwidth of the basic frequency band and an 8× bandwidth of the basic frequency band.

In accordance with another embodiment of the present invention, a data reception apparatus in a communication system includes: a reception unit configured to receive data packets in a multi-bandwidth mode in a basic frequency band capable of being used for transmitting and receiving data to and from a plurality of terminals; a verification unit configured to verify the multi-bandwidth mode from the data packets; and a recovery unit configured to recover the data packets, wherein the multi-bandwidth mode includes a ½× bandwidth of the basic frequency band, a basic bandwidth, a 2× bandwidth of the basic frequency band, a 4× bandwidth of the basic frequency band and an 8× bandwidth of the basic frequency band.

In accordance with another embodiment of the present invention, a data receiving method in a communication system includes: receiving data packets in a multi-bandwidth mode in a basic frequency band capable of being used for transmitting and receiving data to and from a plurality of terminals; verifying the multi-bandwidth mode from the data packets; and recovering the data packets, wherein the multi-bandwidth mode includes a ½× bandwidth of the basic frequency band, a basic bandwidth, a 2× bandwidth of the basic frequency band, a 4× bandwidth of the basic frequency band and an 8× bandwidth of the basic frequency band.

DESCRIPTION OF SPECIFIC EMBODIMENTS

Figure 1:
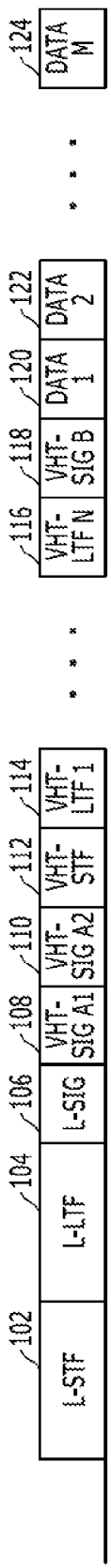
FIGS. 1 to 3 diagrams schematically showing the structures of a frame in a communication system in accordance with embodiments of the present invention.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

The present invention suggests an apparatus and a method for transmitting and receiving data in a communication system, for example, a wireless local area network (hereinafter, referred to as 'WLAN') system. While the WLAN system will be exemplarily described in embodiments of the present invention, the apparatus and the method for transmitting and receiving data suggested in the present invention may be applied to other communication systems.

Also, in an embodiment of the present invention, in a communication system, data are transmitted and received in a new frequency band which is different from a frequency band used for transmitting and receiving data in an existing system, and a multi-bandwidth is supported in the new frequency band such that data may be normally transmitted and received in various frequency bandwidths. In the embodiment of the present invention, in an OFDM (orthogonal frequency division multiplexing)-based WLAN system, a frame for supporting a multi-bandwidth in the new frequency band is configured, and data are transmitted and received through the new frequency band by using the frame, such that systems which support various channel bandwidths can coexist.

In this regard, most systems of WLAN transmission standards which are suggested so far have been developed in such a way as to use multiple antennas or extend a bandwidth so as to increase a transmission speed. Representative examples thereof are the IEEE 802.11n system and the IEEE 802.11ac system. Unlike the existing WLAN system, in a communication system in accordance with an embodiment of the present invention, various bandwidths are supported such that a wide bandwidth may be used according to a channel situation and quick data transmission can be performed, and a function of maintaining compatibility with terminals which support various bandwidths is provided. To this end, in the embodiment of the present invention, a minimum unit bandwidth is defined, a primary channel and a secondary channel are divided on the basis of the defined minimum unit bandwidth, communication is always implemented on the basis of the primary channel, and the secondary channel is appropriately used according to a situation to improve channel utilization.

In the existing WLAN system, a minimum unit channel serves as a basis, and only a pattern of extending a channel is defined on the basis of the minimum unit channel. However, in an embodiment of the present invention, various sub-channels are configured by narrowing a channel bandwidth, and a scheme for utilizing these sub-channels is defined in a communication system, for example, a WLAN system, such that large data can be normally transmitted and received. In particular, in the embodiment of the present invention, a scheme is suggested such that, in consideration of a situation where channel allocation is different from country to country which manage a communication system, a frame, which has a basic channel defined by a standard, for example, a 20 MHz channel of the IEEE 802.11ac system, and a bandwidth below the 20 MHz channel, is configured and is communicated while maintaining compatibility with terminals which support signals with different channel bandwidths.

Moreover, in the case of the IEEE 802.11ac system, a bandwidth is extended to 2×, 4× and 8× bandwidths by adopting the minimum unit bandwidth of 20 MHz as a basic unit to support bandwidths of 40 MHz, 80 MHz and 160 MHz, such that OFDM subcarrier intervals in corresponding bandwidth modes become the same, thereby maintaining an OFDM symbol length and ensuring compatibility. That is to say, in the IEEE 802.11ac system, 512 subcarriers are used in 160 MHz as the maximum bandwidth, 256 subcarriers are used in 80 MHz, 128 subcarriers are used in 40 MHz, and 64 subcarriers are used in 20 MHz as the basic bandwidth. Also, in the IEEE 802.11ac system, in the case where signals are generated to be divided into a primary channel and a secondary channel in an extended bandwidth, the primary channel is caused to be always included such that bandwidth extension is implemented on the basis of the primary channel. In this regard, in a situation where it is necessary to support a bandwidth lower than an existing bandwidth, an approach different from that of the IEEE 802.11ac system is needed.

Therefore, in an embodiment of the present invention, for example, in the case where it is necessary to support 10 MHz bandwidth with 32 subcarriers in the IEEE 802.11ac system, a channel which supports the 10 MHz bandwidth is configured such that a mode corresponding to the 10 MHz bandwidth can coexist with other existing bandwidth modes. Furthermore, in the embodiment of the present invention, a channel is effectively configured to be associated with a frame structure which implements cyclic repetitive transmission by using a basic band.

Furthermore, a communication system in accordance with an embodiment of the present invention, for example, a WLAN system uses a wireless communication technology for providing a high speed data service in an unlicensed band. In particular, unlike an existing cellular system, only if an access point (hereinafter, referred to as 'AP') serving as a base station is power-connected with a wired network, the communication system may be easily installed even by any one and data communication may be performed at a low cost. Therefore, in an embodiment of the present invention, a scheme for configuring an effective frame in consideration of wireless transmission not in the frequency band used in the existing WLAN system but in a new frequency band is suggested, and large data are normally transmitted and received through the new frequency band by using the frame which is configured through the suggested scheme.

In this regard, most systems of WLAN transmission standards which are suggested so far have been developed in such a way as to use multiple antennas or extend a bandwidth so as to improve a transmission speed. Representative examples thereof are the IEEE 802.11n system and the IEEE 802.11ac system. However, while improvement of a transmission speed has a significant meaning in increasing network capacity in a general network environment, coverage expansion has a more significant meaning in a network for information collection, such as a sensor network. In the case where coverage is expanded, since information may be collected over a wide area even with a small number of APs, the sensor network may be constructed with a low cost.

In such a communication system in accordance with the embodiment of the present invention, wireless transmission in the new frequency band means wireless transmission in a frequency band which is different from the 2.4 GHz or 5 GHz band used in the existing WLAN system. Therefore, in the case where the frame structure of the IEEE 802.11ac system is used as it is in the embodiment of the present invention in which wireless transmission is implemented in the new frequency band, data processing rate is likely to deteriorate due to a substantial unnecessary overhead. For example, in the IEEE 802.11ac system, in order to maintain compatibility with the IEEE 802.11a system and the IEEE 802.11n system which are already defined in the same 5 GHz band, additional signals and information are included. However, in the case where the frame structure of the IEEE 802.11ac system is used in the new frequency band in accordance with the embodiment of the present invention, configuration of an efficient frame is possible because additional signals and information are not needed for such compatibility. Further, in the case where a new transmission scheme and a new data transmission rate are defined, bit allocation of control information may be changed.

In the frame structure of the above-described IEEE 802.11ac system, after a legacy short training field (L-STF), a legacy long training field (L-LTF) and a legacy signal field (L-SIG) are first defined in order for compatibility with the IEEE 802.11a system and the IEEE 802.11n system which use the same 5 GHz band, a very high throughput signal field (VHT-SIG) in which the control information of a frame actually used in the IEEE 802.11ac system is included, a very high throughput short training field (VHT-STF) for automatic gain control, a very high throughput long training field (VHT-LTF) for channel estimation, and a data field in which data to be actually transmitted are included, are defined.

The L-STF, L-LTF and L-SIG are fields which are defined for compatibility with the IEEE 802.11a system and the IEEE 802.11n system. Thus, in a system which does not use the 5 GHz band, the fields for the compatibility, that is, the L-STF, L-LTF and L-SIG, serve as unnecessary overheads. Hence, in the embodiment of the present invention, a novel frame structure, which reduces an overhead and includes new control information needed in a new system using a new frequency band, is configured.

The IEEE 802.11ac system enables data transmission of a G bps level while maintaining compatibility with the IEEE 802.11a system and the IEEE 802.11n system in the 5 GHz band. In particular, the IEEE 802.11ac system supports bandwidths of 20 MHz, 40 MHz, 80 MHz and 160 MHz, and transmits maximum 8 data streams using a multiple transmission and reception antenna technology, wherein data are transmitted by configuring a frame to maintain compatibility with other systems as described above. Hereinbelow, a frame structure in a communication system in accordance with an embodiment of the present invention will be described in detail with reference to FIGS. 1 to 3.

FIG. 1 is a diagram schematically showing a frame structure in a communication system in accordance with an embodiment of the present invention. FIG. 1 is a diagram schematically showing the frame structure of the IEEE 802.11ac system in the communication system in accordance with the embodiment of the present invention.

Referring to FIG. 1, a frame of the IEEE 802.11ac system includes control fields in which control information for data transmission to and from a plurality of terminals is included, that is, an L-STF 102, an L-LTF 104, an L-SIG 106, a VHT-SIG A1 108, a VHT-SIG A2 110, a VHT-STF 112, a plurality of VHT-LTFs, for example, a VHT-LTF 1 114 and a VHT-LTF N 116, and a VHT-SIG B 118, and includes a plurality of data fields as data fields in which data to be transmitted to the plurality of terminals are included, that is, a DATA 1 120, a DATA 2 122 and a DATA M 124.

The L-STF 102 is used in signal detection, automatic gain control, frequency error estimation, frame synchronization, and so forth, and the L-LTF 104 is used in channel estimation, frequency error estimation, and so forth. Also, the L-SIG 106 includes transmission rate information, frame length information, and so forth, and the VHT-SIG A1 108 and the VHT-SIG A2 110 include information such as band widths, guard interval lengths, space-time codes, transmission rates (MCS (modulation and coding scheme) levels), data stream numbers, AID information, a used coding technology, beamforming, and so forth.

The VHT-STF 112 is used in automatic gain control, and the VHT-LTF 1 114 and the VHT-LTF N 116 are used in channel estimation. The VHT-SIG B 118 includes transmission rates (MCS levels) by user, for multi-user MIMO (multiinput multi-output), data length information, and so forth, and the DATA 1 120, the DATA 2 122 and the DATA M 124 include data which are to be actually transmitted to users, that is, STAs (stations) as terminals.

The VHT-LTF 1 114 and the VHT-LTF N 116 are determined according to the number of data streams which are to be transmitted through the frame. For example, in the case where only one stream is transmitted, only the VHT-LTF 1 114, that is, one VHT-LTF is included in the frame, and, in the case where the number of streams is 2, the VHT-LTF 1 114 and a VHT-LTF 2, that is, two VHT-LTFs are included in the frame.

The transmission rate information and frame length information of the L-SIG 106 do not actually include the information of data, and causes data transmission not to be implemented during the length of a received frame in the case where the terminals of the IEEE 802.11a system or the IEEE 802.11n system receive the corresponding frame. The transmission rate information and frame length information of the L-SIG 106 become unnecessary information in the case where compatibility with the IEEE 802.11a system or the IEEE 802.11n system is not considered. The functions of the L-STF 102 and the L-LTF 104 may be replaced by the VHT-STF 112 and the VHT-LTFs 114 and 116. In the case where compatibility is not considered as described above, the frame structure of the IEEE 802.11ac system becomes an inefficient frame structure due to the presence of an overhead. A frame structure newly configured by removing such inefficiency will be described in detail with reference to FIG. 2.

Figure 2:
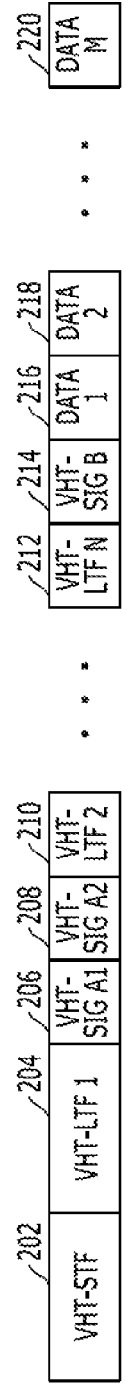

FIG. 2 is a diagram schematically showing a frame structure in a communication system in accordance with another embodiment of the present invention. FIG. 2 is a diagram showing a frame structure in which compatibility with the IEEE 802.11a system or the IEEE 802.11n system is not considered and an overhead is reduced from the frame structure of the IEEE 802.11ac system shown in FIG. 1, to improve efficiency. Also, FIG. 2 is a diagram showing a new frame structure in a new frequency band in a communication system in accordance with another embodiment of the present invention, which is different from a frequency band used for transmitting and receiving data in an existing system.

Referring to FIG. 2, a frame in the new frequency band includes control fields in which control information for data transmission to and from a plurality of terminals is included, that is, a VHT-STF 202, a VHT-SIG A1 206, a VHT-SIG A2 208, a plurality of VHT-LTFs, for example, a VHT-LTF 1 204, a VHT-LTF 2 210 and a VHT-LTF N 212, and a VHT-SIG B 214, and includes a plurality of data fields as data fields in which data to be transmitted to the plurality of terminals are included, that is, a DATA 1 216, a DATA 2 218 and a DATA M 220.

The VHT-STF 202 is used in signal detection, automatic gain control, frequency error estimation, frame synchronization, and so forth, and the VHT-LTF 1 204 is used in channel estimation, frequency error estimation, and so forth. Also, the VHT-SIG A1 206 and the VHT-SIG A2 208 include information such as band widths, guard interval lengths, space-time codes, transmission rates (MCS levels), data stream numbers, AID information, a used coding technology, beamforming, application of a new transmission mode, and so forth.

Not only the VHT-LTF 1 204 but also the VHT-LTF 2 210 and the VHT-LTF N 212 are used in channel estimation, and the VHT-SIG B 214 includes transmission rates (MCS levels) by user, for multi-user MIMO, data length information, and so forth. The DATA 1 216, the DATA 2 218 and the DATA M 220 include data which are to be actually transmitted to users, that is, STAs as terminals.

In the communication system in accordance with the embodiment of the present invention, in order to transmit data using the frame in the new frequency band, the VHT-STF 202 is extended by the length of the L-STF 102 in the above-described frame of the IEEE 802.11ac system, and performs the function performed by the L-STF 102. Among the VHT-LTFs 204, 210 and 212, the VHT-LTF 1 204 as a first long training field is preferentially arranged at the front portion of the frame, that is, next to the VHT-STF 202, and the remaining N−1 number of VHT-LTFs 210 and 212 are arranged after the VHT-SIG A1 206 and the VHT-SIG A2 208. Control information for the frame which all terminals should receive is included in the VHT-SIG A1 206 and the VHT-SIG A2 208.

In the case where the communication system, which transmits and receives data using such frame in the new frequency band, supports a multi-user MIMO function, the VHT-SIG B 214, which includes the transmission rate information by user and the data length information, should be included in the frame structure in the new frequency band. In the case where the communication system does not support the multi-user MIMO function, the VHT-SIG B 214 may be omitted from the frame.

The structures of the VHT-SIG A1 206 and the VHT-SIG A2 208 are as given in Table 1.

TABLE 1

| | | | | |
|---|---|---|---|---|
| VHT-SIG A1 | B0-B1 | Bandwidth | 2-bit | Denoting 20/40/80/160 MHz by 0/1/2/3, respectively. |
| | B3 | Reservation | 1-bit | Fixing to 1 |
| | B4-B9 | Group ID | 6-bit | Including group ID information |
| | B10-21 | Nsts | 12-bit | In the case of a multi-user, denoting the numbers of streams of 4 users to 0 to 4, by 3 bits for each user In the case of a single user, denoting 1(000) to 8(111) streams by B10 to B12, B13 to B21 including partial AID information |
| | B22 | TXOP_PS_NOT_ALLOWED | 1-bit | Indicating whether TXOP_PS can be utilized or not |
| | B23 | Reservation | 1-bit | Fixing to 1 |
| VHT-SIG A2 | B0-B1 | Short GI | 2-bit | Setting according to whether short GI is used or not |
| | B2-B3 | Coding scheme (coding) | 2-bit | Indicating whether LDPC and BCC are used or not |
| | B4-B7 | Transmission rate (MCS) | 4-bit | Defining 10 MCSs from BPSK 1/2 code rate to 256-QAM 5/6 code rate |
| | B8 | Beamforming | 1-bit | Indicating whether beamforming is used or not |
| | B9 | Reservation | 1-bit | Fixing to 1 |
| | B10-B17 | CRC | 8-bit | Inserting CRC bit |
| | B18-B23 | Tail | 6-bit | For tailing trellis of Viterbi decoder |

In Table 1, in the case where the number of possible bandwidths (BWs) of the communication system in accordance with the embodiment of the present invention as shown in FIG. 2, which uses the frame structure in the new frequency band, is at least 4, the region B3 of the VHT-SIG A1 206 may be additionally utilized for bandwidth information in consideration of the cases where a bandwidth is equal to or larger than 20 MHz, 40 MHz, 80 MHz and 160 MHz, for example. In the case of Nsts which denotes the number of space-time transmission streams in the VHT-SIG A1 206, maximum 4 streams are allocated to 4 users for a multi-user, and, in the case of a single user, maximum 8 streams may be allocated. In the communication system in accordance with the embodiment of the present invention as shown in FIG. 2, which uses the frame structure in the new frequency band, as can be readily seen from above descriptions, each of the numbers of streams to be allocated is decreased to a half to secure a margin of 1 bit, and the 1 bit secured in this way may be allocated to a new transmission scheme.

That is to say, in the communication system in accordance with the embodiment of the present invention as shown in FIG. 2, which uses the frame structure in the new frequency band, a transmission rate is decreased to a half through repetitive transmission and the like when compared to a conventional system, and 1 bit may be allocated to define a mode capable of increasing a communication distance.

Therefore, in the communication system in accordance with the embodiment of the present invention, 3 bits are allocated to each user in the case of a multi-user, wherein 1 bit of the 3 bits is allocated as a bit for indicating whether or not to perform repetitive transmission, and the remaining 2 bits denote the number of transmission streams. Furthermore, in the communication system in accordance with the embodiment of the present invention, even in the case of a single user, 1 bit is used to indicate whether or not to perform repetitive transmission, the remaining 2 bits define 1 to 4 transmission streams, and, in the case where an additional transmission mode is further needed, the additional transmission mode may be used by using other reserved bits.

For example, in the communication system in accordance with the embodiment of the present invention, in the case where up to a 4× repetitive transmission mode or a 6× repetitive transmission mode is defined to further extend a communication distance, up to the region B23 of the VHT-SIG A1 206 or the region B9 of the VHT-SIG A2 208 is utilized in defining a new mode. Moreover, in the communication system in accordance with the embodiment of the present invention, in the case where a mode for extending a communication distance by increasing a reception sensitivity as in repetitive transmission is used, the VHT-STF 202 and the VHT-LTFs 204, 210 and 212 are used by being extended in the lengths thereof to improve performance of initial signal detection and channel estimation. The extended VHT-LTFs 204, 210 and 212 have the same structure as an existing OFDM (orthogonal frequency division multiplexing) symbol. In the case where the VHT-LTFs 204, 210 and 212 are not extended, they have the structure of DGI (double GI (guard interval))+LTF+LTF as in the L-LTF 104, and, in the case where the VHT-LTFs 204, 210 and 212 are extended, extension is made by increasing the number of the structures of GI+LTF which are added next to the structure of DGI+LTF+LTF.

For the sake of convenience in explanation, it is assumed that, in the basic structures of the VHT-SIG A1 206 and the VHT-SIG A2 208, 52 data subcarriers, which remain by excluding guard band, DC (direct current) and pilot subcarriers from total 64 subcarriers, are used as BPSK (binary phase shift keying) ½ coding rate channel codes. According to this fact, in the communication system in accordance with the embodiment of the present invention, while 26 bits may be allocated to each OFDM symbol, only 24 bits may be allocated to each OFDM symbol by using only 48 data subcarriers as in the L-SIG 106 of the IEEE 802.11ac system.

For example, in the communication system in accordance with the embodiment of the present invention, as in the IEEE 802.11ac system, a W Hz bandwidth mode using 64 subcarriers, a 2W Hz bandwidth mode using 128 subcarriers, a 4W Hz bandwidth mode using 256 subcarriers and an 8W Hz bandwidth mode using 512 subcarriers are basically present, and a W/2 Hz bandwidth mode using 32 subcarriers is additionally present. In this regard, while W=20 MHz is defined in the IEEE 802.11ac system, in the communication system in accordance with the embodiment of the present invention, a bandwidth is used by being changed so as to use a new frequency band different from that of the IEEE 802.11ac system. The bandwidth in the new frequency band is defined as W Hz.

In other words, in the communication system in accordance with the embodiment of the present invention, the VHT-SIG A1 206 and the VHT-SIG A2 208 for the W/2 bandwidth mode and the VHT-SIG A1 206 and the VHT-SIG A2 208 for the W Hz, 2W Hz, 4W Hz and 16W Hz bandwidth modes are separately defined. In the communication system in accordance with the embodiment of the present invention, since the W Hz, 2W Hz, 4W Hz and 16W Hz bandwidth modes are defined by defining the W Hz bandwidth mode using 64 subcarriers and then extending the W Hz bandwidth mode, the total numbers of the bits included in the VHT-SIG A1 206 and the VHT-SIG A2 208 are the same with each other. Therefore, in the communication system in accordance with the embodiment of the present invention, in the case of allocating two OFDM symbols to the VHT-SIG A1 206 and the VHT-SIG A2 208, total 52 bits or 48 bits are used to allocate control information.

Figure 4:
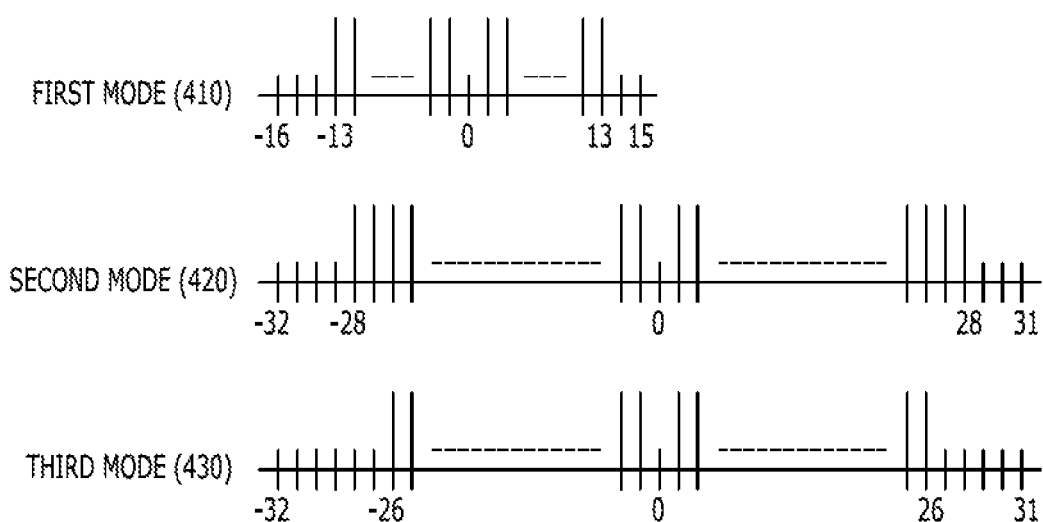
FIG. 4 is a diagram schematically showing subcarrier allocation in a communication system in accordance with an embodiment of the present invention.

Also, in the communication system in accordance with the embodiment of the present invention, because subcarriers capable of being used in the W/2 Hz bandwidth mode are decreased to ½, the number of bits capable of being allocated to each OFDM symbol is limited. Namely, in the communication system in accordance with the embodiment of the present invention, as shown in FIG. 4, subcarriers are allocated according to the W Hz bandwidth mode using 64 subcarriers and the W/2 Hz bandwidth mode using 32 subcarriers. Since FIG. 4 will be described later in detail, concrete descriptions thereof will be omitted herein.

That is to say, in the communication system in accordance with the embodiment of the present invention, since a difference in the numbers of information bits capable of being allocated to the VHT-SIG A1 206 and the VHT-SIG A2 208 according to bandwidths is substantial, the OFDM symbol numbers and bit allocation schemes of the VHT-SIG A1 206 and the VHT-SIG A2 208 are made different according to bandwidths.

In detail, first, in the case of the W Hz bandwidth mode, in the communication system in accordance with the embodiment of the present invention, when assuming that two OFDM symbols are used as the VHT-SIG A1 206 and the VHT-SIG A2 208, bit allocation for the 48 bits or 52 bits of the VHT-SIG A1 206 and the VHT-SIG A2 208, that is, the information included in the VHT-SIG A1 206 and the VHT-SIG A2 208, is as follows.

- MCS (modulation and coding scheme): 4 bits are needed (maximum 16 cases including 10 cases of the IEEE 802.11ac system and new MCSs, in which repetitive transmission is applied to a lowest transmission rate, are denoted).
- Length (packet length): At least 10 bits are needed as the length is denoted by the unit of byte (denoted in a 2 byte or 4 byte type) or by the unit of OFDM symbol (an additional bit for solving the ambiguity of the last OFDM symbol is included). Here, 12 bits are needed in the case of the IEEE 802.11a system, 16 bits are needed in the case of the IEEE 802.11n system, and 17 bits are needed in the case of the IEEE 802.11ac system.

Guard interval (guard interval length): 2, 3 or 4 types are included in a regular GI type, a short GI type, and, as the occasion demands, a shorter GI type, and 1 bit or 2 bits are needed.

BW (bandwidth): 2 bits for denoting the W Hz, 2W Hz, 4W Hz and 8W Hz bandwidth modes and 1 bit for denoting the W/2 Hz bandwidth mode are added. In the case of the W/2 Hz bandwidth mode, 1 bit may not be included in BW information for automatic detection using a preamble. 2 to 3 bits are needed.

STBC (space-time block code): 1 bit is needed to indicate whether STBCs are utilized or not.

Tail: 6 bits of 0 are inserted last.

Nsts (number of space-time streams): Maximum 4 as the number of data streams to be simultaneously transmitted using MIMO may be denoted, and 2 bits are needed.

Coding scheme: 1 bit is needed to select a convolution code and a low density parity check (LDPC) code.

TXOP-PS (power save using TXOP (transmission opportunity)): 1 bit is needed to denote selection according to whether TXOP-PS is utilized or not.

CRC: 8 bits are needed to perform CRC (cyclic redundancy check) for the VHT-SIG A1 206 and the VHT-SIG A2 208 (the number of bits may be changed through change of the coding rate of the CRC).

Reserved (reserved bit): Bits left after allocation are denoted by preset numbers at preset locations.

Further, in the communication system in accordance with the embodiment of the present invention, the contents used in the IEEE 802.11 system may be changed and other contents may be added. The following information is additionally included. That is to say, the information additionally included in the VHT-SIG A1 206 and the VHT-SIG A2 208 is as follows.

Application field and QoS (quality of service) requirements.

Aggregation.

Battery power warning.

Power level.

PSMP (power save multi-poll) group.

Warning signals.

A number of parameters associated with STA connection.

In other words, in the communication system in accordance with the embodiment of the present invention, the VHT-SIG A1 206 and the VHT-SIG A2 208 constituted by 48 bits or 52 bits by combining bits as described above are transmitted during 2 OFDM symbols.

Moreover, in the W/2 Hz bandwidth mode, since total 24 bit allocation is possible in the case where only 2 OFDM symbols are allocated to the VHT-SIG A1 206 and the VHT-SIG A2 208, in the communication system in accordance with the embodiment of the present invention, only essential information is allocated as follows. That is to say, the essential information included in the VHT-SIG A1 206 and the VHT-SIG A2 208 is as follows.

MCS: 4 bits.

Length: 12 bits.

Tail: 6 bits.

Parity: 1 bit (error check is performed using parity, instead of CRC)

W/2 Hz BW (or GI): 1 bit. 1 bit may be allocated to identify the W/2 Hz bandwidth mode. Since automatic detection may be implemented using a preamble structure, a guard interval length is denoted instead.

In this way, in the communication system in accordance with the embodiment of the present invention, since only the essential information of 24 bits is allocated to the VHT-SIG A1 206 and the VHT-SIG A2 208, the number of OFDM symbols is increased to 3 or 4 in the case where information is additionally needed, so that the needed information is additionally allocated as in the W Hz bandwidth mode. Further, in the communication system in accordance with the embodiment of the present invention, in the case of the W/2 Hz bandwidth mode, the lengths of the VHT-SIG A1 206 and the VHT-SIG A2 208 may be made different from packet to packet, such that the amounts of the information included in the VHT-SIG A1 206 and the VHT-SIG A2 208 are made different from each other. In this regard, in order for a reception apparatus to verify the differences in the lengths of the VHT-SIG A1 206 and the VHT-SIG A2 208 and verify the extension of the VHT-LTFs 204, 210 and 212 in the case of using repetitive transmission, the VHT-SIG A1 206 and the VHT-SIG A2 208 are modified by combining Q-BPSK and BPSK and are then transmitted. According to this fact, the reception apparatus first discriminates the W/2 Hz bandwidth mode and the W Hz, 2W Hz, 4W Hz and 8W Hz bandwidth modes from each other, verifies the VHT-SIG A1 206 and the VHT-SIG A2 208 in such a way as to correspond to such discrimination, detects the numbers of OFDM symbols used in the VHT-SIG A1 206 and the VHT-SIG A2 208 even in case of the W/2 Hz bandwidth mode, and extracts the information included in the VHT-SIG A1 206 and the VHT-SIG A2 208. Hereinbelow, a new frame structure in which a repetitive transmission scheme is considered in a communication system in accordance with an embodiment of the present invention will be described in detail with reference to FIG. 3.

Figure 3:
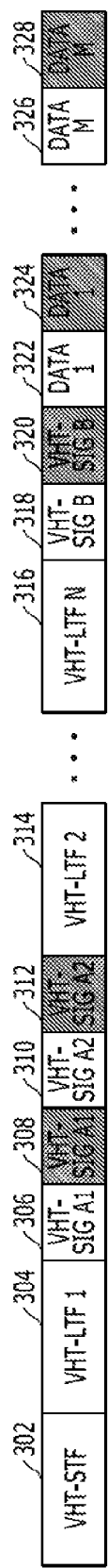

FIG. 3 is a diagram schematically showing a frame structure in a communication system in accordance with still another embodiment of the present invention. FIG. 3 is a diagram showing a new frame structure in which a repetitive transmission scheme is considered in the new frame structure for the new frequency band, shown in FIG. 2. Also, FIG. 3 is a diagram showing a new frame structure in which each of a VHT-SIG A1 and a VHT-SIG A2 includes 2 OFDM symbols and a 2× repetitive transmission scheme is exemplified.

Referring to FIG. 3, a frame in the new frequency band includes control fields in which control information for data transmission to and from a plurality of terminals is included, that is, a VHT-STF 302, two VHT-SIG A1s 306 and 308, two VHT-SIG A2s 310 and 312, a plurality of VHT-LTFs, that is, a VHT-LTF 1 304, a VHT-LTF 2 314 and a VHT-LTF N 316, and two VHT-SIG Bs 318 and 320 according to repetitive transmission, and includes a plurality of data fields as data fields in which data to be transmitted to the plurality of terminals are included, that is, two DATA is 322 and 324 and two DATA Ms 326 and 328.

The VHT-STF 302 is used in signal detection, automatic gain control, frequency error estimation, frame synchronization, and so forth, and the VHT-LTF 1 304 is used in channel estimation, frequency error estimation, and so forth. Also, the VHT-SIG A1s 306 and 308 and the VHT-SIG A2s 310 and 312 include information such as band widths, guard interval lengths, space-time codes, transmission rates (MCS levels), data stream numbers, AID information, a used coding technology, beamforming, and so forth.

Not only the VHT-LTF 1 304 but also the VHT-LTF 2 314 and the VHT-LTF N 316 are used in channel estimation, and the VHT-SIG Bs 318 and 320 include transmission rates (MCS levels) by user, for multi-user MIMO, data length information, and so forth. The DATA is 322 and 324 and the DATA Ms 326 and 328 include data which are to be actually transmitted to users, that is, STAs as terminals.

In the communication system in accordance with the embodiment of the present invention, in the case where a repetitive transmission scheme is considered, that is, a repetitive transmission mode is used, in the frame structure in the new frequency band shown in FIG. 2, not only a VHT-SIG A1 and a VHT-SIG A2 but also a VHT-SIG B repeat their respective previous symbols, that is, are consecutively repeated as in the frame structure shown in FIG. 3 and thus the two VHT-SIG A1s 306 and 308, the two VHT-SIG A2s 310 and 312 and the two VHT-SIG Bs 318 and 320 are included in the frame, and also, the data fields repeat their respective previous symbols, that is, are consecutively repeated and thus the two DATA is 322 and 324 and the two DATA Ms 326 and 328 are included in the frame. The consecutively repeated VHT-SIG A1s 306 and 308, VHT-SIG A2s 310 and 312, VHT-SIG Bs 318 and 320, DATA is 322 and 324 and DATA Ms 326 and 328 have the types of symbols which repeat their respective previous symbols, and are included in the frame through a variety of repetition schemes such as simple symbol repetition or repetition by changing the positions of subcarriers.

In the communication system in accordance with the embodiment of the present invention which uses the frame structure shown in FIG. 3, as reception sensitivity is improved, the length of the VHT-STF 302 is extended and thus signal detection performance in the reception apparatus is improved, and the lengths of the VHT-LTF2 314 and the VHT-LTF N 316 are extended as well. Namely, as aforementioned above with reference to FIG. 2, the VHT-STF 302 is extended by the length of the L-STF 102 in the above-described frame of the IEEE 802.11ac system, and performs the function performed by the L-STF 102. Among the VHT-LTFs 304, 314 and 316, the VHT-LTF 1 304 as a first long training field is preferentially arranged at the front portion of the frame, that is, next to the VHT-STF 302, and the remaining N−1 number of VHT-LTFs 314 and 316 are arranged after the VHT-SIG A1s 306 and 308 and the VHT-SIG A2s 310 and 312. Hereinbelow, subcarrier allocation according to bandwidth modes in a communication system in accordance with an embodiment of the present invention will be described in detail with reference to FIG. 4.

FIG. 4 is a diagram schematically showing subcarrier allocation in a communication system in accordance with an embodiment of the present invention. FIG. 4 is a diagram exemplarily showing subcarrier allocation of OFDM symbols to a VHT-SIG A1 and a VHT-SIG A2 in the case of a W Hz bandwidth mode in which 64 subcarriers are used and a W/2 Hz bandwidth mode in which 32 subcarriers are used, in a communication system in accordance with an embodiment of the present invention.

Referring to FIG. 4, a communication system allocates the subcarriers of OFDM symbols to a VHT-SIG A1 and a VHT-SIG A2 in a W/2 Hz bandwidth mode with 32 subcarriers and a W Hz bandwidth mode with 64 subcarriers, as a first mode 410. In the case of the W/2 Hz bandwidth mode, both the case in which the number of data subcarriers is 52, as a second mode 420, and the case in which the number of data subcarriers is 48, as a third mode 430, are considered.

In the W/2 Hz bandwidth mode with 32 subcarriers as the first mode 410, the number of data subcarriers is 24 and the number of pilot subcarriers is 2. In the W Hz bandwidth mode with 64 subcarriers as the second mode 420, the number of data subcarriers is 52 and the number of pilot subcarriers is 4. In the W Hz bandwidth mode with 64 subcarriers as the third mode 430, the number of data subcarriers is 48 and the number of pilot subcarriers is 4. Because the allocation of the subcarriers of the OFDM symbols to the VHT-SIG A1 and the VHT-SIG A2 in the W/2 Hz bandwidth mode and the W Hz bandwidth mode, that is, bit allocation according to the information included in the VHT-SIG A1 and the VHT-SIG A2, was described above in detail, concrete descriptions thereof will be omitted herein.

In this way, in the communication system in accordance with the embodiment of the present invention, a frame structure in a new frequency band, which adopts the transmission frame structure of the IEEE 802.11ac system and which may not consider compatibility with the IEEE 802.11a system and the IEEE 802.11n system, is generated, and an overhead for compatibility with other systems is reduced. Further, the frame is configured by correcting control information in contrast to the addition of a new transmission mode, and the IEEE 802.11ac system may be effectively applied to a new system by being slightly corrected in the standards thereof. Hereinbelow, a channel configuration for supporting a multi-bandwidth in a communication system in accordance with an embodiment of the present invention will be described in detail with reference to FIG. 5.

Figure 5:
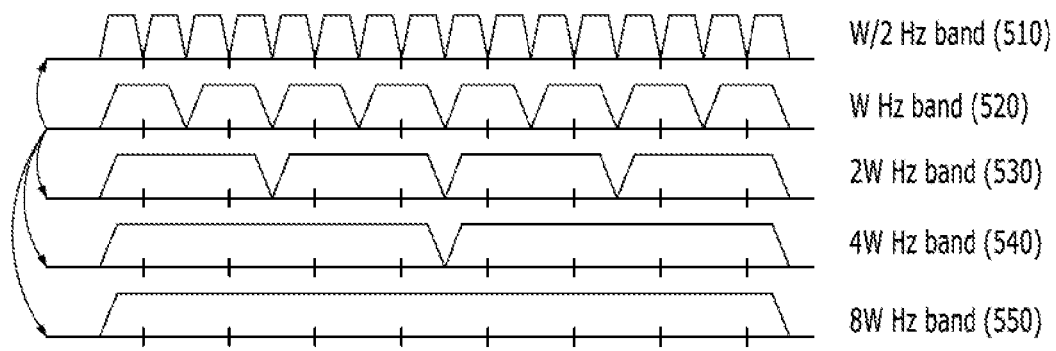
FIG. 5 is a diagram schematically showing a channel configuration in a communication system in accordance with an embodiment of the present invention.

FIG. 5 is a diagram schematically showing a channel configuration in a communication system in accordance with an embodiment of the present invention. FIG. 5 is a diagram showing a channel configuration with ½×, 2×, 4× and 8× bandwidths on the basis of a basic bandwidth of W, that is, a channel configuration with W/2, W, 2W, 4W and 8W bandwidths.

Referring to FIG. 5, in a communication system, a W Hz band 520 as a basic bandwidth, a W/2 Hz band 510 with a ½× bandwidth, a 2W Hz band 530 with a 2× bandwidth, a 4W Hz band 540 with a 4× bandwidth, and an 8W Hz band 550 with an 8× bandwidth are respectively configured.

As aforementioned above, in the case of the IEEE 802.11ac system, 40 MHz, 80 MHz and 160 MHz bandwidths are supported on the basis of the basic bandwidth of 20 MHz to support 2×, 4× and 8× bandwidths, so that a high speed WLAN service can be provided. In particular, since the bandwidth of a 5 GHz band, in which the IEEE 802.11ac system operates, has a bandwidth which is sufficiently secured throughout the world, by configuring channels of the 40 MHz, 80 MHz and 160 MHz bandwidths on the basis of the basic bandwidth of 20 MHz as described above, it is possible to use a wide bandwidth. However, a mode with a bandwidth below the basic bandwidth of 20 MHz is needed in the case where a high speed data service is not required and the number of available channels is small in the IEEE 802.11ac system. Therefore, in the communication system in accordance with the embodiment of the present invention, a sub-band mode below the basic channel bandwidth is defined, that is, the W/2 Hz band 510 with the ½× bandwidth is configured by adopting the W Hz band 520 as the basic bandwidth.

In detail, in the communication system in accordance with the embodiment of the present invention, as shown in FIG. 5, by adopting the W Hz bandwidth of the existing WLAN system as the basic bandwidth, channels are allocated to the 2W, 4W and 8W Hz bands by extending the basic bandwidth to the 2×, 4× and 8× bandwidths, and a channel is allocated to the W/2 Hz band by reducing the basic bandwidth to the ½× bandwidth. In the case where the existing WLAN system is the IEEE 802.11ac system, the basic bandwidth W Hz is 20 MHz.

In order to allow systems with such various bandwidths to coexist, that is, support a multi-bandwidth, in the communication system in accordance with the embodiment of the present invention, a primary channel and a secondary channel are divided in the bandwidths of an available frequency band, and all terminals which belong to the same service set always use the same primary channel such that even a terminal which uses a narrow bandwidth can detect a signal of a wide bandwidth. In other words, in the embodiment of the present invention, by applying the above-described scheme to the sub-band mode, one sub-band among sub-bands is utilized as the primary channel. Further, in the embodiment of the present invention, since the usage rate of a sub-band corresponding to the primary channel among the sub-bands may be lower than the usage rate of a sub-band corresponding to the secondary channel, random one of the sub-bands is used, without distinguishing the primary channel and the secondary channel among the sub-bands, in consideration of adjacent channel interference. Hereinbelow, a primary channel and a secondary channel of a channel configuration which supports a multi-bandwidth in the communication system in accordance with the embodiment of the present invention will be described in detail with reference to FIG. 6.

Figure 6:
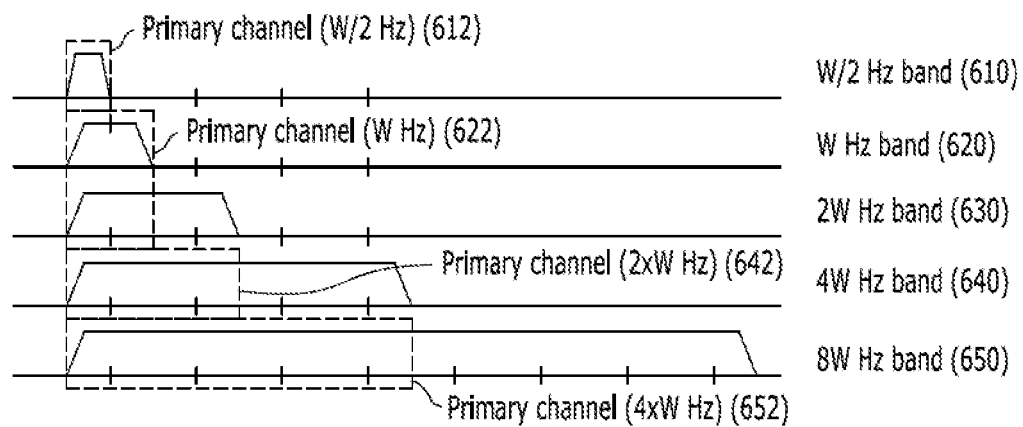
FIG. 6 is a diagram schematically showing a primary channel configuration and a secondary channel configuration in the communication system in accordance with the embodiment of the present invention.

FIG. 6 is a diagram schematically showing a primary channel configuration and a secondary channel configuration in the communication system in accordance with the embodiment of the present invention. FIG. 6 is a diagram schematically showing primary channel allocation in the multi-bandwidth, for example, W/2, 2W, 4W and 8W bandwidths, in the channel configuration which supports the multi-bandwidth shown in FIG. 5.

Referring to FIG. 6, in the communication system, as described above, by adopting a W Hz band 620 as a basic bandwidth, a W/2 Hz band 610 with a ½× bandwidth, a 2W Hz band 630 with a 2× bandwidth, a 4W Hz band 640 with a 4× bandwidth, and an 8W Hz band 650 with an 8× bandwidth are respectively configured. In the communication system, sub-bands are divided from the channels of the multi-bandwidth configured in this way, and a random sub-band among the sub-bands is allocated as a primary channel.

In detail, the communication system allocates the basic bandwidth W Hz in the channels of the multi-bandwidth, for example, a 200 MHz bandwidth, as a primary channel. Accordingly, first, in the W Hz band 620 as the basic bandwidth, an entirety 622 of the W Hz band 620 is allocated as the primary channel. In the W/2 Hz band 610 with the ½× bandwidth, an entirety 612 of the W/2 Hz band 610 is allocated as the primary channel. In the 2W Hz band 630 with the 2× bandwidth, the 2W Hz band 630 is divided into 2 sub-bands and a left W Hz sub-band 622 is allocated as the primary channel. In the 4W Hz band 640 with the 4× bandwidth, the 4W Hz band 640 is divided into 2 sub-bands and a left 2W Hz sub-band 642 is allocated as the primary channel. In the 8W Hz band 650 with the 8× bandwidth, the 8W Hz band 650 is divided into 2 sub-bands and a left 4W Hz sub-band 652 is allocated as the primary channel.

In this way, in the communication system, the half bands of the multi-bandwidth are divided into sub-bands on the basis of the basic bandwidth in the channels of the multi-bandwidth, a random sub-band among the sub-bands, for example, the left sub-band in FIG. 6, is allocated as the primary channel, or the right sub-band is allocated as the primary channel. Namely, in the communication system, the half bands of the multi-bandwidth are allocated as the primary channel on the basis of the basic bandwidth in the channels of the multi-bandwidth. In this regard, as in the case of transmitting and receiving data in the bandwidths of 20 MHz, 40 MHz, 80 MHz and 160 MHz in the IEEE 802.11ac system, in the case where the primary channel and the secondary channel are randomly allocated in the multi-bandwidth shown in FIG. 6, interference may occur between adjacent channels. Thus, in the communication system in accordance with the embodiment of the present invention, the primary channel and the secondary channel are allocated in the sub-bands of the multi-bandwidth in consideration of the interference between adjacent channels. Hereinbelow, primary channel allocation and secondary channel allocation in the multi-bandwidth in consideration of interference between adjacent channels in the communication system in accordance with the embodiment of the present invention will be described in detail with reference to FIG. 7.

Figure 7:
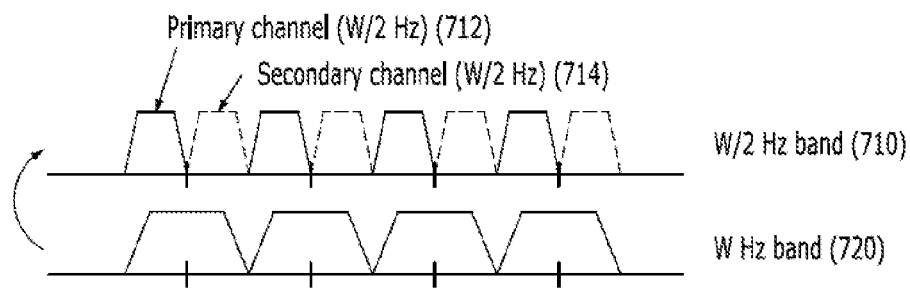
FIG. 7 is a diagram schematically showing primary channel allocation and secondary channel allocation in the communication system in accordance with the embodiment of the present invention.

FIG. 7 is a diagram schematically showing primary channel allocation and secondary channel allocation in the communication system in accordance with the embodiment of the present invention.

Referring to FIG. 7, in the communication system, as described above, by adopting a W Hz band 720 as a basic bandwidth, in a W/2 Hz band 710 with a ½× bandwidth, a left sub-band 712 as a half band is allocated as a primary channel, and a right sub-band 714 as the remaining half band is allocated as a secondary channel. In the W/2 Hz band 710 with the ½× bandwidth of the basic bandwidth, the secondary channel is used by being allocated together with the primary channel, and accordingly, since the left sub-band 712 may be used by being allocated only as the primary channel, when viewed in terms of channel configuration of the W/2 Hz band 710, channelization is implemented in a type in which the secondary channel being the right sub-band 714 is omitted, that is, channels are emptied.

In the communication system in accordance with the embodiment of the present invention, when configuring a multi-bandwidth signal, a scheme is used, in which all bandwidth modes have the same OFDM subcarrier interval such that the lengths of OFDM symbols become the same with one another. In this regard, in the case of the IEEE 802.11ac system, in the state in which the interval of subcarriers is fixed to 312.5 kHz, 64 subcarriers are used in a 20 MHz bandwidth mode, 128 subcarriers are used in a 40 MHz bandwidth mode, 256 subcarriers are used in an 80 MHz bandwidth mode, and 512 subcarriers are used in a 160 MHz bandwidth mode. Therefore, in the communication system in accordance with the embodiment of the present invention, in the case where a 10 MHz bandwidth mode which has a ½× bandwidth of the 20 MHz bandwidth mode as a basic bandwidth mode is needed, 32 subcarriers are used. Hereinbelow, a subcarrier configuration in a ½× bandwidth of the basic bandwidth in the communication system in accordance with the embodiment of the present invention will be described in detail with reference to FIG. 8.

Figure 8:
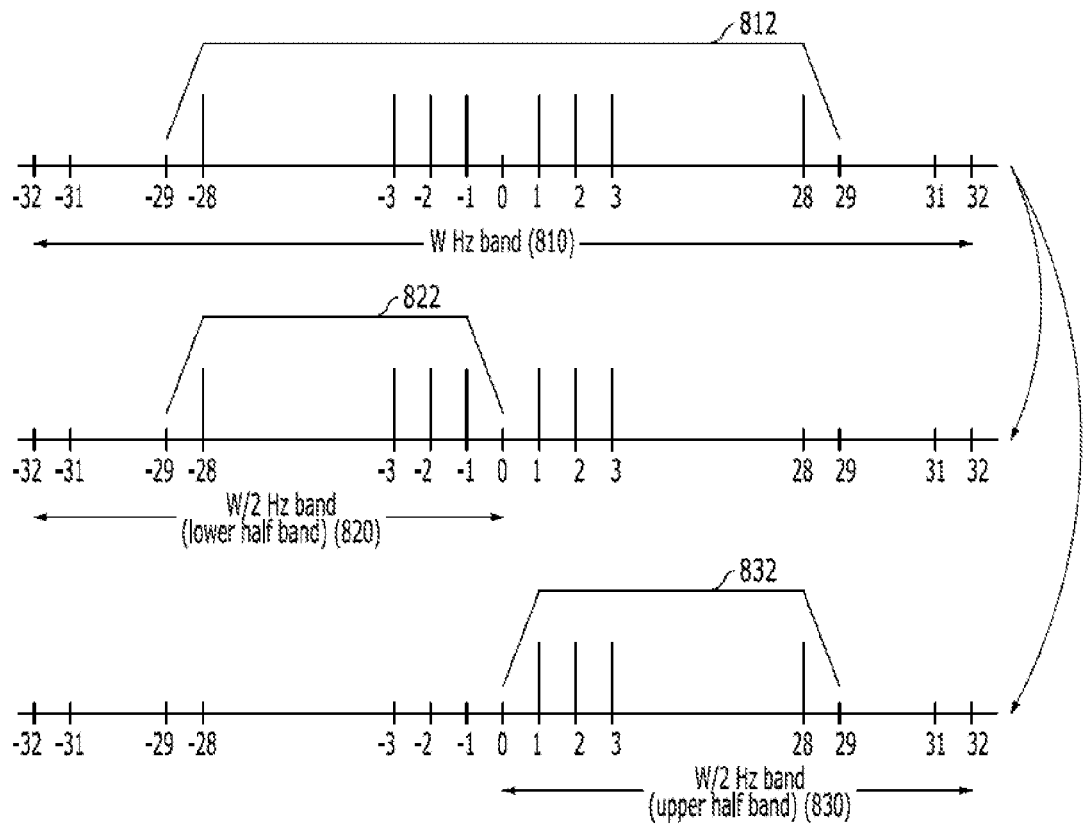
FIG. 8 is a diagram schematically showing a subcarrier configuration in a ½× bandwidth of a basic bandwidth in the communication system in accordance with the embodiment of the present invention.

FIG. 8 is a diagram schematically showing a subcarrier configuration in a ½× bandwidth of a basic bandwidth in the communication system in accordance with the embodiment of the present invention. FIG. 8 is a diagram showing a lower half band mode which uses a negative subcarrier index for subcarriers in a ½× bandwidth of a basic bandwidth and an upper half band mode which uses a positive subcarrier index for subcarriers in a ½× bandwidth of a basic bandwidth, among the subcarriers of the basic bandwidth, for example, on the basis of the IEEE 802.11ac system in which 58 subcarrier signals excluding a guard band and DC among 64 subcarriers in the basic bandwidth of W Hz are allocated and transmitted.

Referring to FIG. 8, in the communication system, in the case where a W Hz band signal 812 in a W Hz band 810 of a basic bandwidth has 64 subcarriers, a lower half band 820 as a W/2 Hz band is configured to have a ½× bandwidth of the basic bandwidth by using a left half band among the 64 subcarriers, and an upper half band 830 as a W/2 Hz band is configured to have a ½× bandwidth of the basic bandwidth by using a right half band among the 64 subcarriers. A W/2 Hz band signal 822 in the lower half band 820 has left ½ subcarriers of the 64 subcarriers, and a W/2 Hz band signal 832 in the upper half band 830 has right ½ subcarriers of the 64 subcarriers.

In the case where a bandwidth is reduced to ½ in this way, since an amount of data which can be transmitted through one OFDM symbol in a basic bandwidth signal is transmitted through 2 OFDM symbols and the length of the OFDM symbol is maintained as it is, a data transmission rate is reduced to ½. Hereinbelow, a subcarrier configuration in a basic bandwidth mode and a subcarrier configuration in a ½× bandwidth mode in the communication system in accordance with the embodiment of the present invention will be described in detail with reference to FIG. 9.

Figure 9:
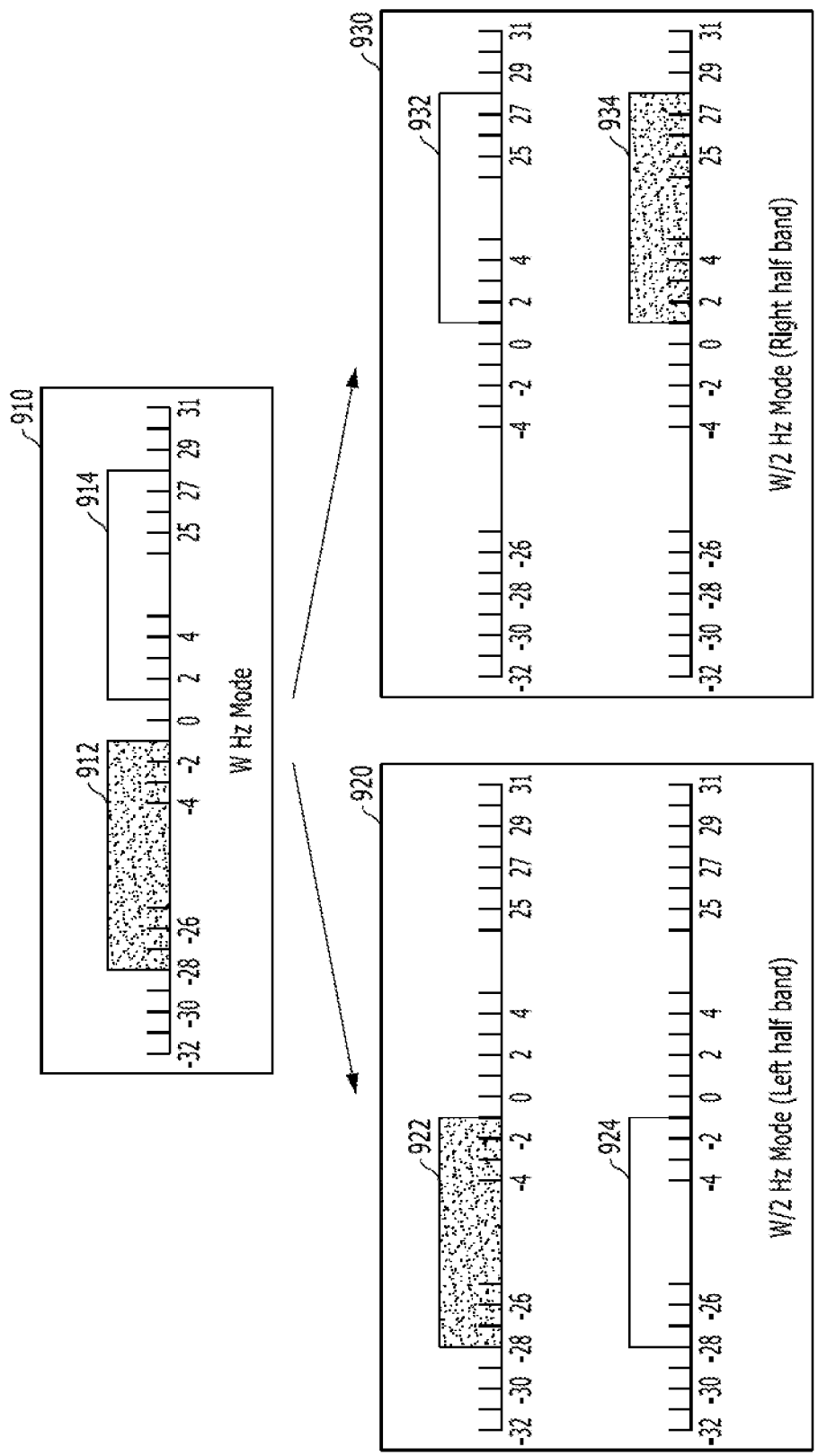
FIG. 9 is a diagram schematically showing a subcarrier configuration in a basic bandwidth mode and a subcarrier configuration in a ½× bandwidth mode in the communication system in accordance with the embodiment of the present invention.

FIG. 9 is a diagram schematically showing a subcarrier configuration in a basic bandwidth mode and a subcarrier configuration in a ½× bandwidth mode in the communication system in accordance with the embodiment of the present invention.

Referring to FIG. 9, the communication system transmits and receives signals 912 and 914 of a W Hz band through 56 subcarriers in a basic bandwidth W Hz, for example, in a basic bandwidth mode of 20 MHz, that is, a W Hz mode 910, and transmits and receives signals 922, 924, 932 and 934 of a W/2 band through 28 subcarriers in W/2 bandwidth modes 920 and 930 as a ½× bandwidth of the basic bandwidth W Hz.

In particular, between the W/2 bandwidth modes 920 and 930, in the first W/2 bandwidth mode 920 of a left half band, the signals 922 and 924 of the W/2 band are transmitted and received through 28 subcarriers which are positioned in the left half band of the basic bandwidth. In the first W/2 bandwidth mode 920 of the left half band, the signal 912 of a first W Hz band in the W Hz mode 910 is transmitted and received through 28 subcarriers as the signal 922 of a first W/2 band, and the signal 914 of a second W Hz band in the W Hz mode 910 is transmitted and received through 28 subcarriers as the signal 924 of a second W/2 band.

Further, between the W/2 bandwidth modes 920 and 930, in a second W/2 bandwidth mode 930 of a right half band, the signals 932 and 934 of the W/2 band are transmitted and received through 28 subcarriers which are positioned in the right half band of the basic bandwidth. In the second W/2 bandwidth mode 930 of the right half band, the signal 914 of the second W Hz band in the W Hz mode 910 is transmitted and received through 28 subcarriers as the signal 932 of the second W/2 band, and the signal 912 of the first W Hz band in the W Hz mode 910 is transmitted and received through 28 subcarriers as the signal 934 of the first W/2 band.

Therefore, in the W/2 bandwidth modes 920 and 930, in order to transmit the same amount of data as in the W Hz mode 910, 2 data transmission times are needed, and accordingly, a data transmission rate is reduced to ½. Hereinbelow, a subcarrier configuration in a basic bandwidth mode in consideration of cyclic repetitive transmission in a communication system in accordance with another embodiment of the present invention will be described in detail with reference to FIG. 10.

Figure 10:
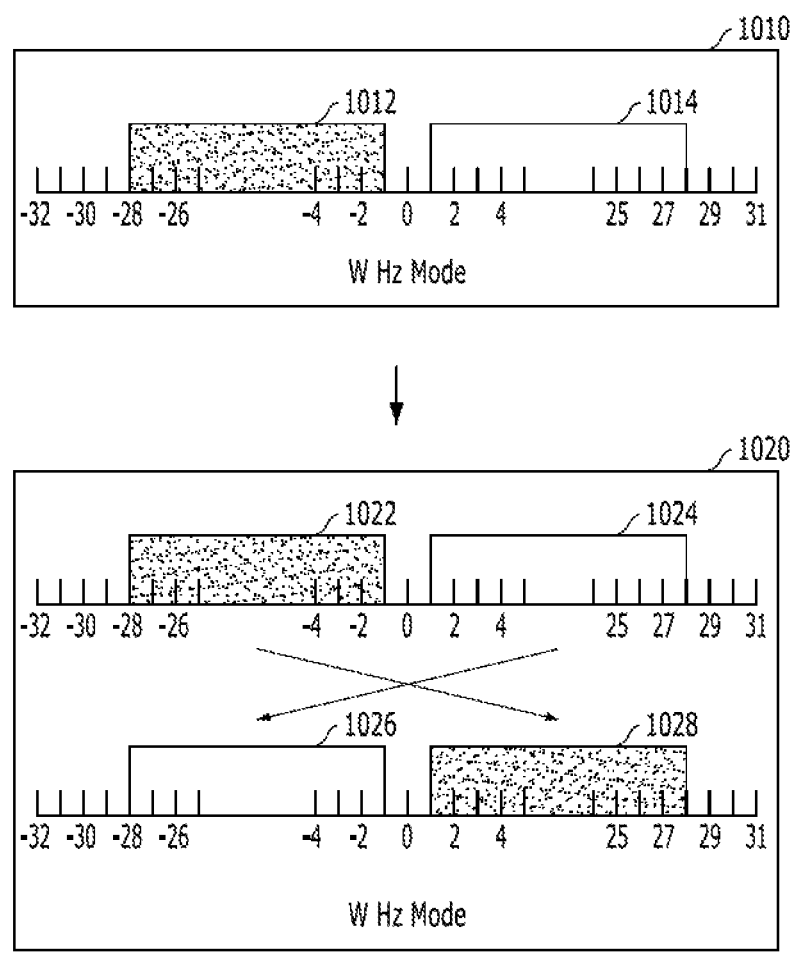
FIG. 10 is a diagram schematically showing a subcarrier configuration in a basic bandwidth mode in a communication system in accordance with another embodiment of the present invention.

FIG. 10 is a diagram schematically showing a subcarrier configuration in a basic bandwidth mode in a communication system in accordance with another embodiment of the present invention. FIG. 10 is a diagram schematically showing a subcarrier configuration in the case of considering cyclic repetitive transmission in the subcarrier configuration in the basic bandwidth mode of FIG. 9.

Referring to FIG. 10, a communication system transmits and receives signals 1012 and 1014 of a W Hz band through 56 subcarriers in a basic bandwidth W Hz, for example, in a basic bandwidth mode of 20 MHz, that is, a W Hz mode 1010, and transmits and receives again the signals 1012 and 1014 of the W Hz band through 56 subcarriers in consideration of cyclic repetition. In detail, in the W Hz mode 1010, after transmitting and receiving the signal 1012 of a first W Hz band as a signal 1022 of a third W Hz band through 28 subcarriers which are positioned in the left half band of the basic bandwidth, the signal 1012 of the first W Hz band is transmitted and received as a signal 1028 of a fourth W Hz band through 28 subcarriers which are positioned in the right half band of the basic bandwidth, according to cyclic repetition. Also, in the W Hz mode 1010, after transmitting and receiving the signal 1014 of a second W Hz band as a signal 1024 of a fifth W Hz band through 28 subcarriers which are positioned in the right half band of the basic bandwidth, the signal 1014 of the second W Hz band is transmitted and received as a signal 1026 of a sixth W Hz band through 28 subcarriers which are positioned in the left half band of the basic bandwidth, according to cyclic repetition.

That is to say, the communication system transmits the same data through 2 OFDM symbols to increase a reception sensitivity even in the W Hz mode 1010 and extend a communication distance. At this time, a group with a negative subcarrier index, for example, the subcarriers positioned in the left half band, and a group with a positive subcarrier index, for example, the subcarriers positioned in the right half band, are distinguished from each other, and the subcarriers of the left half band and the right half band are cyclically and repetitively transmitted and received, by which a diversity gain is acquired. While FIG. 10 shows only the case in which subcarriers are divided equally into 2 groups, that is, the subcarriers of the left half band and the right half band, cyclic repetitive transmission is possible by changing the positions of subcarriers in a variety of ways. Hereinbelow, a subcarrier configuration in a basic bandwidth mode in consideration of in-symbol repetitive transmission in a communication system in accordance with another embodiment of the present invention will be described in detail with reference to FIG. 11.

Figure 11:
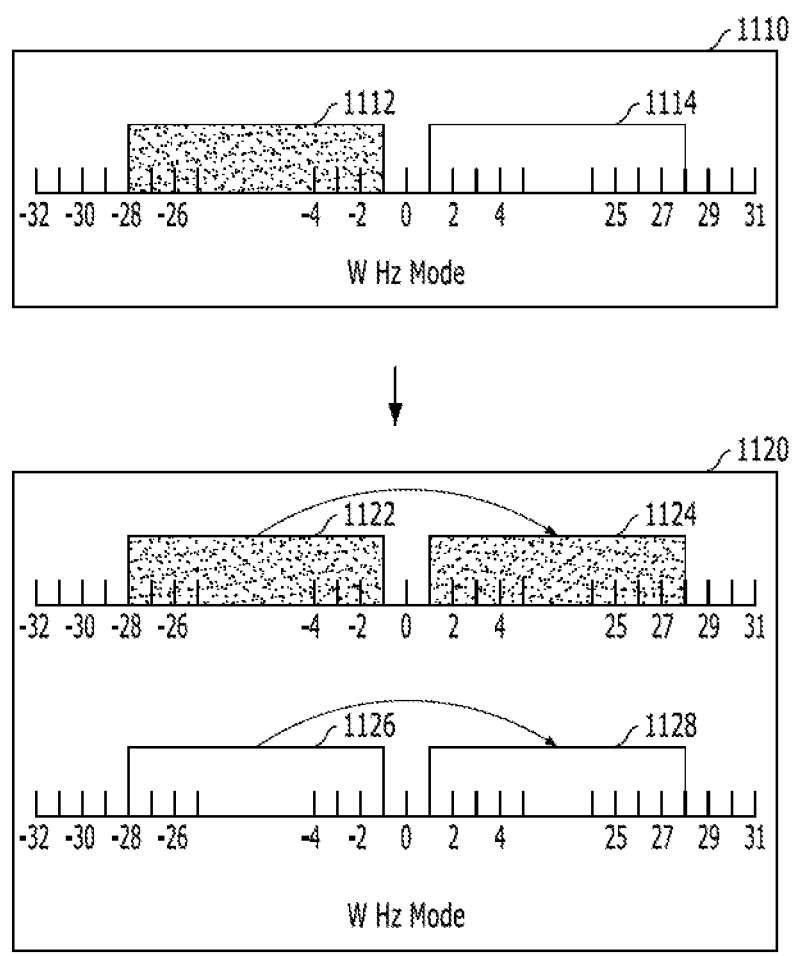
FIG. 11 is a diagram schematically showing a subcarrier configuration in a basic bandwidth mode in a communication system in accordance with another embodiment of the present invention.

FIG. 11 is a diagram schematically showing a subcarrier configuration in a basic bandwidth mode in a communication system in accordance with another embodiment of the present invention. FIG. 11 is a diagram schematically showing a subcarrier configuration in the case of considering repetitive transmission in a symbol, in the subcarrier configuration in the basic bandwidth mode of FIG. 9.

Referring to FIG. 11, a communication system transmits and receives signals 1112 and 1114 of a W Hz band through 56 subcarriers in a basic bandwidth W Hz, for example, in a basic bandwidth mode of 20 MHz, that is, a W Hz mode 1110, and transmits and receives again the signals 1112 and 1114 of the W Hz band through 56 subcarriers in consideration of in-symbol repetition. In detail, in the W Hz mode 1110, the signal 1112 of a first W Hz band is transmitted and received as a signal 1122 of a third W Hz band through 28 subcarriers which are positioned in the left half band of the basic bandwidth, and the signal 1112 of the first W Hz band is transmitted and received as a signal 1124 of a fourth W Hz band through 28 subcarriers which are positioned in the right half band of the basic bandwidth, according to in-symbol repetition. Also, in the W Hz mode 1110, the signal 1114 of a second W Hz band is transmitted and received as a signal 1126 of a fifth W Hz band through 28 subcarriers which are positioned in the left half band of the basic bandwidth, and the signal 1114 of the second W Hz band is transmitted and received as a signal 1128 of a sixth W Hz band through 28 subcarriers which are positioned in the right half band of the basic bandwidth, according to in-symbol repetition.

That is to say, the communication system transmits the same data through an OFDM symbol to increase a reception sensitivity even in the W Hz mode 1110 and extend a communication distance. At this time, a group with a negative subcarrier index, for example, the subcarriers positioned in the left half band, and a group with a positive subcarrier index, for example, the subcarriers positioned in the right half band, are distinguished from each other, and the subcarriers of the left half band and the right half band are repetitively transmitted and received in the symbol, by which a diversity gain is acquired. While FIG. 11 shows only the case in which subcarriers are divided equally into 2 groups, that is, the subcarriers of the left half band and the right half band, it is to be noted that cyclic repetitive transmission is possible by changing the positions of subcarriers in a variety of ways.

In this way, in the communication system in accordance with the embodiment of the present invention, while a bandwidth is maintained as it is, according to an application field of a system, since the same data are repetitively transmitted several times, a transmission mode for improving a reception sensitivity is provided. In other words, as described above with reference to FIG. 10, as the same data are transmitted twice, that is, are cyclically and repetitively transmitted, during 2 OFDM symbols while changing the positions of subcarriers, a communication distance may be extended. Also, as described above with reference to FIG. 11, as an amount of data capable of being transmitted in one OFDM symbol is reduced to ½ and the data reduced to ½ are repetitively transmitted in the OFDM symbol, a communication distance may be extended.

In an embodiment of the present invention, not only the repetition and subcarrier allocation described with reference to FIGS. 10 and 11 but also various numbers of repetition times and various types of subcarrier allocation may be implemented. Moreover, while it was generally described with reference to FIGS. 10 and 11 for the sake of convenience in explanation that 2 half bands are repeated in the same type in the basic bandwidth, even in the case where 2 subcarriers including the same information are present in one OFDM symbol, repetitive transmission is implemented. In particular, even in the case where one subcarrier of 2 subcarriers including the same information is changed according to a predetermined rule, for example, the code or phase of the subcarrier is changed, repetitive transmission is implemented. Hereinbelow, transmission and reception of a data packet supporting a multi-bandwidth in the communication system in accordance with the embodiment of the present invention will be described in detail with reference to FIG. 12.

Figure 12:
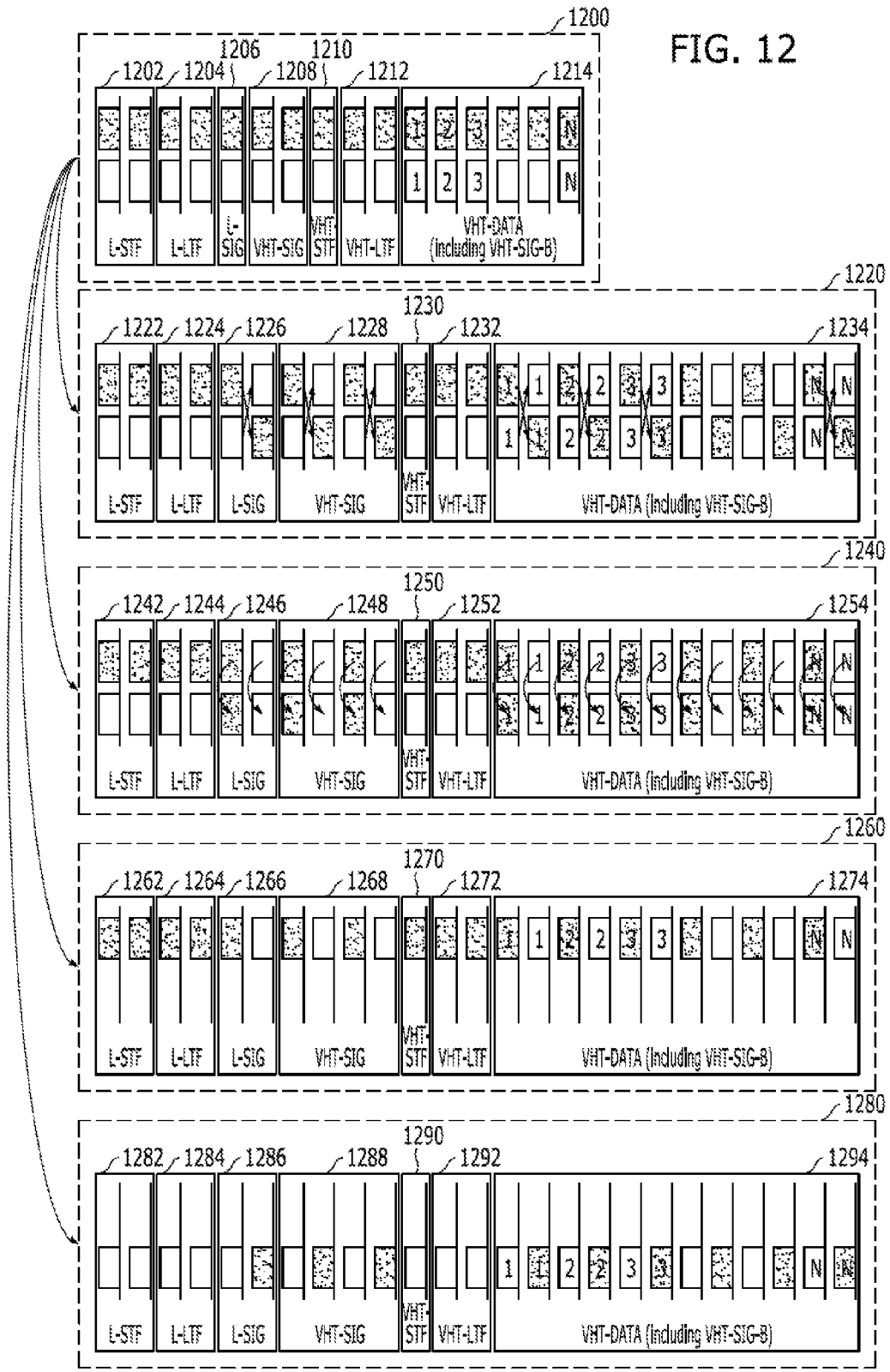
FIG. 12 is a diagram schematically showing transmission and reception of a data packet in a multi-bandwidth in the communication system in accordance with the embodiment of the present invention.

FIG. 12 is a diagram schematically showing transmission and reception of a data packet in a multi-bandwidth in the communication system in accordance with the embodiment of the present invention. FIG. 12 is a diagram showing transmission and reception of a data packet by using the sub-band mode and the repetitive transmission mode as described above, on the basis of the IEEE 802.11ac system which has the 20 MHz bandwidth as a basic bandwidth.

Referring to FIG. 12, in the communication system, a data packet 1200 in the basic bandwidth W Hz, for example, the basic bandwidth mode of the 20 MHz band, that is, the W Hz mode, includes a legacy short training field (L-STF) 1202, a legacy long training field (L-LTF) 1204, a legacy signal field (L-SIG) 1206, a very high throughput signal field (VHT-SIG) 1208, a very high throughput short training field (VHT-STF) 1210, a very high throughput long training field (VHT-LTF) 1212, and a VHT-DATA 1214 including a VHT-SIG B. The data packet 1200 is transmitted and received through subcarriers of the basic bandwidth.

Also, in the communication system, as the data packet 1200 in the basic bandwidth mode, that is, the W Hz mode, is cyclically and repetitively transmitted as described above, a data packet 1220 in a W Hz cyclic repetitive transmission mode includes an L-STF 1222, an L-LTF 1224, an L-SIG 1226, a VHT-SIG 1228, a VHT-STF 1230, a VHT-LTF 1232, and a VHT-DATA 1234 including a VHT-SIG B. At this time, according to cyclic repetitive transmission, the L-SIG 1226, the VHT-SIG 1228 and the VHT-DATA 1234 are cyclically and repetitively transmitted through subcarriers of the basic bandwidth.

Further, in the communication system, as the data packet 1200 in the basic bandwidth mode, that is, the W Hz mode, is repetitively transmitted in a symbol as described above, a data packet 1240 in a W Hz in-symbol repetitive transmission mode includes an L-STF 1242, an L-LTF 1244, an L-SIG 1246, a VHT-SIG 1248, a VHT-STF 1250, a VHT-LTF 1252, and a VHT-DATA 1254 including a VHT-SIG B. At this time, according to in-symbol repetitive transmission, the L-SIG 1246, the VHT-SIG 1248 and the VHT-DATA 1254 are repetitively transmitted in a symbol through subcarriers of the basic bandwidth.

Moreover, in the communication system, in W/2 bandwidth modes as ½× bandwidths of the basic bandwidth W Hz, transmission and reception are implemented through subcarriers of the W/2 bandwidths. In particular, a data packet 1260 in an upper half band mode of a W/2 bandwidth includes an L-STF 1262, an L-LTF 1264, an L-SIG 1266, a VHT-SIG 1268, a VHT-STF 1270, a VHT-LTF 1272, and a VHT-DATA 1274 including a VHT-SIG B, in the upper half band of the basic bandwidth W Hz. The data packet 1260 is transmitted and received through subcarriers corresponding to the upper half band of the basic bandwidth W Hz. Furthermore, a data packet 1280 in a lower half band mode of the W/2 bandwidth includes an L-STF 1282, an L-LTF 1284, an L-SIG 1286, a VHT-SIG 1288, a VHT-STF 1290, a VHT-LTF 1292, and a VHT-DATA 1294 including a VHT-SIG B, in the lower half band of the basic bandwidth W Hz.

Although transmission and reception of data packets according to cyclic repetitive transmission and in-symbol repetitive transmission in the basic bandwidth and transmission and reception of data packets in a multi-bandwidth, in particular, the ½× bandwidth of the basic bandwidth, were exemplarily described above with reference to FIG. 12, in the communication system in accordance with the embodiment of the present invention, data packets may be transmitted and received by dividing sub-bands in the ½× bandwidth of the basic bandwidth not into 2 sub-bands as the upper half band and the lower half band or the right half band and the left half band but into a plurality of sub-bands, and data packets may be transmitted and received by changing the number of repetition times and performing subcarrier allocation in a variety of ways in the basic bandwidth.

In FIG. 12, the x axis represents an OFDM symbol index, for example, a time axis, and the y axis represents a subcarrier index, for example, a frequency axis. While it was described with reference to FIG. 12 for the sake of convenience in explanation that the L-SIG, the VHT-SIG and the VHT-DATA of data packets are repetitively transmitted upon cyclic repetition and in-symbol repetition for improving a reception sensitivity, in particular, information and actual data OFDM symbols are repetitively transmitted, it is to be noted that the L-STF, the L-LTF and the VHT-LTF may be repetitively transmitted.

In this way, in the communication system in accordance with the embodiment of the present invention, as the data packets as shown in FIG. 12 are transmitted and received, the realization of transmission and reception apparatuses may be efficiently implemented. In particular, in the case where data packets are transmitted and received in the sub-band mode in consideration of the cyclic repetitive transmission or in-symbol repetitive transmission, transmission and reception apparatuses with the same structure may transmit and receive the data packets regardless of negative subcarriers or positive subcarriers.

Furthermore, in the communication system in accordance with the embodiment of the present invention, in the case of CCA (channel clear assessment) representing a channel occupation state that plays an important role in reception of a WLAN system, CCA is detected by dividing a physical layer into a primary channel sub-band and a secondary channel sub-band to support sub-bands, and a CCA detection result is informed to an MAC (media access control) layer. In this regard, while, in the IEEE 802.11ac system, by adopting the basic channel unit of 20 MHz as a basic unit, CCA in primary channel sub-bands of 20 MHz, 40 MHz and 80 MHz and CCA in secondary channel sub-bands of 20 MHz, 40 MHz and 80 MHz are present, in the communication system in accordance with the embodiment of the present invention, as a 10 MHz bandwidth mode as the ½× bandwidth of the basic bandwidth is supported, CCA for 20 MHz is divided into 2 sub-band CCAs and these 2 sub-band CCAs are informed to the MAC layer. In addition, in the communication system in accordance with the embodiment of the present invention, a plurality of sub-bands are administrated in primary channel and secondary channel types, and as in the IEEE 802.11ac system, CCA is represented by being divided into primary channel sub-bands and secondary channel sub-bands. At this time, in the case where sub-bands are not divided, CCA is represented in the same way for the respective channels. Hereinbelow, reception of a data packet in a multi-bandwidth, for example, in the basic bandwidth mode and the ½× bandwidth mode, in the communication system in accordance with the embodiment of the present invention will be described in detail with reference to FIG. 13.

Figure 13:
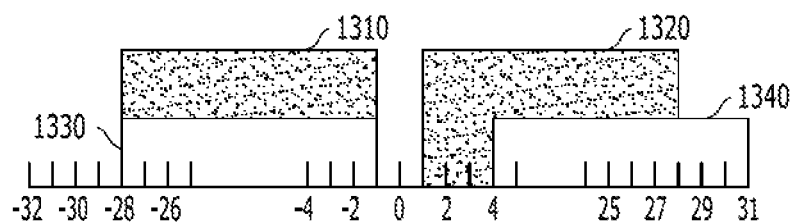
FIG. 13 is a diagram schematically showing reception of a data packet in a multi-bandwidth in the communication system in accordance with the embodiment of the present invention.

FIG. 13 is a diagram schematically showing reception of a data packet in a multi-bandwidth in the communication system in accordance with the embodiment of the present invention. FIG. 13 is a diagram showing subcarrier allocation of the data packet received in the W Hz bandwidth mode using 64 subcarriers and the W/2 bandwidth mode using 32 subcarriers.

Referring to FIG. 13, the communication system receives data packets 1310 and 1320 in the W Hz mode of the basic bandwidth W Hz and receives data packets 1330 and 1340 in the W/2 Hz mode as the ½× bandwidth mode of the basic bandwidth W Hz.

Namely, a transmission apparatus in the communication system transmits the data packets 1310 and 1320 through 64 subcarriers in the W Hz bandwidth mode which uses 64 subcarriers and transmits data packets 1330 and 1340 through 32 subcarriers in the W/2 Hz bandwidth mode which uses 32 subcarriers, and a reception apparatus in the communication system divisionally receives the data packets 1310 and 1320 in the W Hz bandwidth mode and the data packets 1330 and 1340 in the W/2 Hz bandwidth mode. In other words, the reception apparatus identifies the data packets 1310 and 1320 received through the W Hz bandwidth and the data packets 1330 and 1340 received through the W/2 bandwidth, by using control signals which represent mode identification, that is, control signals which represent the W Hz bandwidth mode using 64 subcarriers and the W/2 bandwidth mode using 32 subcarriers, and identifies the data packets 1310 and 1320 received through the W Hz bandwidth and the data packets 1330 and 1340 received through the W/2 bandwidth, by using a difference in signal power of subcarriers. That is to say, the reception apparatus identifies the data packets 1310 and 1320 received through the W Hz bandwidth and the data packets 1330 and 1340 received through the W/2 bandwidth, by using the control signals or power of received signals for subcarriers.

In detail, as shown in FIG. 13, in the case where received signals undergo subcarrier allocation, the reception apparatus identifies the W Hz bandwidth mode, the lower half band W/2 Hz bandwidth mode and the upper half band W/2 Hz bandwidth mode through signal detection in respective bandwidths. In other words, the reception apparatus verifies whether a received signal has signal power of a 32 subcarrier unit as a W/2 bandwidth unit. In particular, in the case where a received signal is present in the upper half band, in order to identify whether the received signal present in the upper half band is a part of a W Hz bandwidth signal or a W/2 Hz bandwidth signal which occupies the upper half band W/2 bandwidth, the reception apparatus compares power of +1 subcarrier, +2 subcarrier and +3 subcarrier and power of +29 subcarrier, +30 subcarrier and +31 subcarrier. Through a power difference or a power rate according to such comparison, the reception apparatus identifies whether the received signal present in the upper half band is a part of a W Hz bandwidth signal or a W/2 Hz bandwidth signal which occupies the upper half band W/2 bandwidth. Hereinbelow, a data transmission apparatus in the communication system in accordance with the embodiment of the present invention will be described in detail with reference to FIG. 14.

Figure 14:
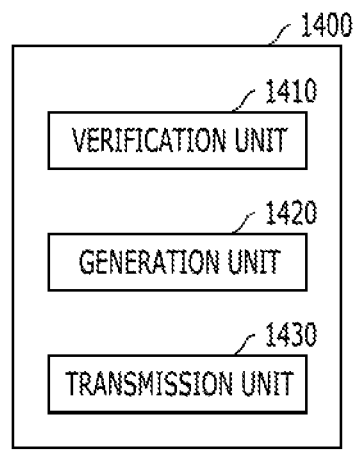
FIG. 14 is a diagram schematically showing the structure of a data transmission apparatus in a communication system in accordance with an embodiment of the present invention.

FIG. 14 is a diagram schematically showing the structure of a data transmission apparatus in a communication system in accordance with an embodiment of the present invention.

Referring to FIG. 14, a data transmission apparatus 1400 includes a verification unit 1410 configured to verify a multi-bandwidth mode to support a multi-bandwidth in a new frequency band which is different from a frequency band, for example, a frequency band used for transmitting and receiving data in an existing system, a generation unit 1420 configured to generate data packets for transmitting and receiving data through subcarriers of the multi-bandwidth, and a transmission unit 1430 configured to transmit the data packets through the subcarriers of the multi-bandwidth to terminals.

As described above, the verification unit 1410 verifies the frequency band capable of being used for transmitting and receiving data, for example, the new frequency band which is different from the frequency band used for transmitting and receiving data in the IEEE 802.11n system and the IEEE 802.11ac system as the existing WLAN system, and verifies the multi-bandwidth mode in the frequency band. As aforementioned above, the multi-bandwidth mode includes a W Hz mode in a basic bandwidth, a W/2 Hz mode in the ½× bandwidth of the basic bandwidth, a 2W Hz mode in the 2× bandwidth of the basic bandwidth, a 4W Hz mode in the 4× bandwidth of the basic bandwidth, and an 8W Hz mode in the 8× bandwidth of the basic bandwidth.

The generation unit 1420 generates the data packets corresponding to the multi-bandwidth mode. Since the data packets in the multi-bandwidth mode, that is, in the basic bandwidth, the ½× bandwidth of the basic bandwidth, the 2× bandwidth of the basic bandwidth, the 4× bandwidth of the basic bandwidth and the 8× bandwidth of the basic bandwidth were described above in detail, concrete descriptions thereof will be omitted herein.

The transmission unit 1430 transmits the data packets through the subcarriers in the multi-bandwidth mode, that is, in the basic bandwidth, the ½× bandwidth of the basic bandwidth, the 2× bandwidth of the basic bandwidth, the 4× bandwidth of the basic bandwidth and the 8× bandwidth of the basic bandwidth, to the terminals. Hereinbelow, data transmitting operations in the communication system in accordance with the embodiment of the present invention will be described in detail with reference to FIG. 15.

Figure 15:
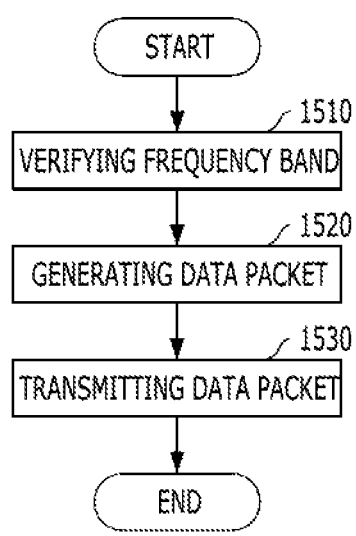
FIG. 15 is a diagram schematically showing a data transmitting procedure in the data transmission apparatus in a communication system in accordance with an embodiment of the present invention.

FIG. 15 is a diagram schematically showing a data transmitting procedure in the data transmission apparatus in a communication system in accordance with an embodiment of the present invention.

Referring to FIG. 15, in step 1510, the data transmission apparatus verifies a frequency band capable of being used for transmitting and receiving data, for example, a new frequency band which is different from a frequency band used for transmitting and receiving data in the IEEE 802.11n system and the IEEE 802.11ac system as an existing WLAN system, and verifies a multi-bandwidth mode in the frequency band. The multi-bandwidth mode includes a W Hz mode in a basic bandwidth, a W/2 Hz mode in the ½× bandwidth of the basic bandwidth, a 2W Hz mode in the 2× bandwidth of the basic bandwidth, a 4W Hz mode in the 4× bandwidth of the basic bandwidth, and an 8W Hz mode in the 8× bandwidth of the basic bandwidth.

In step 1520, the data transmission apparatus generates data packets corresponding to the multi-bandwidth mode. Since the data packets in the multi-bandwidth mode, that is, in the basic bandwidth, the ½× bandwidth of the basic bandwidth, the 2× bandwidth of the basic bandwidth, the 4× bandwidth of the basic bandwidth and the 8× bandwidth of the basic bandwidth were described above in detail, concrete descriptions thereof will be omitted herein.

In step 1530, the data transmission apparatus transmits the data packets through subcarriers in the multi-bandwidth mode, that is, in the basic bandwidth, the ½× bandwidth of the basic bandwidth, the 2× bandwidth of the basic bandwidth, the 4× bandwidth of the basic bandwidth and the 8× bandwidth of the basic bandwidth, to terminals. Hereinbelow, a data reception apparatus in the communication system in accordance with the embodiment of the present invention will be described in detail with reference to FIG. 16.

Figure 16:
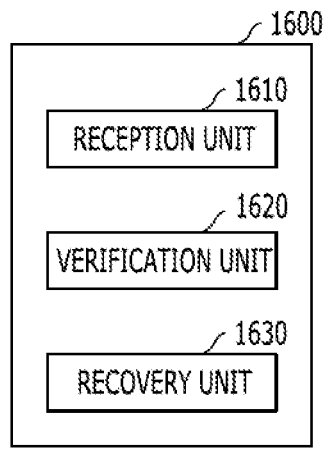
FIG. 16 is a diagram schematically showing the structure of a data reception apparatus in a communication system in accordance with an embodiment of the present invention.

FIG. 16 is a diagram schematically showing the structure of a data reception apparatus in a communication system in accordance with an embodiment of the present invention.

Referring to FIG. 16, a data reception apparatus 1600 includes a reception unit 1610 configured to receive data packets from the data transmission apparatus, for example, an AP, through subcarriers of a multi-bandwidth mode in an available frequency band, for example, a new frequency band which is different from a frequency band used for transmitting and receiving data in an existing system, a verification unit 1620 configured to verify the multi-bandwidth mode through the data packets, and a recovery unit 1630 configured to recover the data packets which are received through the subcarriers of the multi-bandwidth mode.

The reception unit 1610 receives the data packets through the subcarriers of the multi-bandwidth mode, that is, in a basic bandwidth, the ½× bandwidth of the basic bandwidth, the 2× bandwidth of the basic bandwidth, the 4× bandwidth of the basic bandwidth and the 8× bandwidth of the basic bandwidth, in the available frequency band, for example, the new frequency band frequency band which is different from the frequency band used for transmitting and receiving data in the IEEE 802.11n system and the IEEE 802.11ac system as the existing WLAN system. Since the data packets in the multi-bandwidth mode, that is, in the basic bandwidth, the ½× bandwidth of the basic bandwidth, the 2× bandwidth of the basic bandwidth, the 4× bandwidth of the basic bandwidth and the 8× bandwidth of the basic bandwidth were described above in detail, concrete descriptions thereof will be omitted herein.

The verification unit 1620 verifies the multi-bandwidth mode through the data packets which are received through the subcarriers in the multi-bandwidth mode, that is, in the basic bandwidth, the ½× bandwidth of the basic bandwidth, the 2× bandwidth of the basic bandwidth, the 4× bandwidth of the basic bandwidth and the 8× bandwidth of the basic bandwidth, that is, verifies bandwidths through which the data packets are transmitted.

The recovery unit 1630 recovers the data packets which are received through the subcarriers in the multi-bandwidth mode, that is, in the basic bandwidth, the ½× bandwidth of the basic bandwidth, the 2× bandwidth of the basic bandwidth, the 4× bandwidth of the basic bandwidth and the 8× bandwidth of the basic bandwidth, and provides a corresponding service to a user through the recovery of the data packets. Hereinbelow, data receiving operations in the communication system in accordance with the embodiment of the present invention will be described in detail with reference to FIG. 17.

Figure 17:
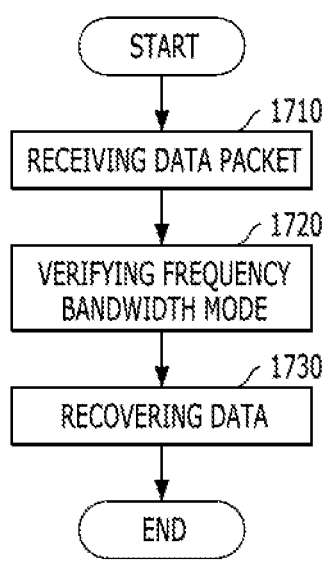
FIG. 17 is a diagram schematically showing a data receiving procedure in the data reception apparatus in a communication system in accordance with an embodiment of the present invention.

FIG. 17 is a diagram schematically showing a data receiving procedure in the data reception apparatus in a communication system in accordance with an embodiment of the present invention.

Referring to FIG. 17, in step 1710, the data reception apparatus receives data packets through subcarriers of a multi-bandwidth mode, that is, in a basic bandwidth, the ½× bandwidth of the basic bandwidth, the 2× bandwidth of the basic bandwidth, the 4× bandwidth of the basic bandwidth and the 8× bandwidth of the basic bandwidth, in an available frequency band, for example, a new frequency band frequency band which is different from a frequency band used for transmitting and receiving data in the IEEE 802.11n system and the IEEE 802.11ac system as an existing WLAN system. Since the data packets in the multi-bandwidth mode, that is, in the basic bandwidth, the ½× bandwidth of the basic bandwidth, the 2× bandwidth of the basic bandwidth, the 4× bandwidth of the basic bandwidth and the 8× bandwidth of the basic bandwidth were described above in detail, concrete descriptions thereof will be omitted herein.

In step 1720, the data reception apparatus verifies the multi-bandwidth mode through the data packets which are received through the subcarriers in the multi-bandwidth mode, that is, in the basic bandwidth, the ½× bandwidth of the basic bandwidth, the 2× bandwidth of the basic bandwidth, the 4× bandwidth of the basic bandwidth and the 8× bandwidth of the basic bandwidth, that is, verifies bandwidths through which the data packets are transmitted.

In step 1730, the data reception apparatus recovers the data packets which are received through the subcarriers in the multi-bandwidth mode, that is, in the basic bandwidth, the ½× bandwidth of the basic bandwidth, the 2× bandwidth of the basic bandwidth, the 4× bandwidth of the basic bandwidth and the 8× bandwidth of the basic bandwidth, and provides a corresponding service to a user through the recovery of the data packets.

As is apparent from the above descriptions, in the communication system in accordance with the embodiments of the present invention, various bandwidth modes, that is, a multi-bandwidth mode is defined, and, in order for coexistence of the various bandwidth modes of the multi-bandwidth mode, channels are allocated and a frame is generated. As a consequence, efficiency in realizing a communication system is accomplished in cooperation with structures for cyclic repetitive transmission, etc. That is to say, in the embodiments of the present invention, a wireless communication system is suited to various environments, that is, to the case where transmission is to be implemented at a high transmission rate due to a large channel margin and the case where channels should be subdivided due to a small channel margin, so that large data can be normally transmitted and received.

In the embodiments of the present invention, by configuring a frame in a new frequency band and a frame for supporting the multi-bandwidth in the new frequency band in the communication system, data throughput may be improved and data error rate may be decreased. Furthermore, as systems for supporting various frequency bandwidths in the new frequency band coexist, large data may be normally transmitted and received.

While the present invention has been described with respect to the specific embodiments, it will be apparent to those skilled in the art that various changes and modifications may be made without departing from the spirit and scope of the invention as defined in the following claims.

What is claimed is:

1. A data transmission apparatus in a communication system, comprising:
    a verification unit configured to verify a basic frequency band capable of being used for transmitting and receiving data packets to and from a plurality of terminals, and a multi-bandwidth mode in the basic frequency band;
    a generation unit configured to generate the data packets in the multi-bandwidth mode; and
    a transmission unit configured to transmit the data packets in the multi-bandwidth mode,
    wherein the multi-bandwidth mode includes a ½× bandwidth mode of the basic frequency band, a basic bandwidth mode, a 2× bandwidth mode of the basic frequency band, a 4× bandwidth mode of the basic frequency band and an 8× bandwidth mode of the basic frequency band,
    wherein the transmission unit is configured to transmit the data packets through subcarriers of a first half band and a second half band, using one of a cyclic repetitive transmission scheme and an in-symbol repetitive transmission scheme,
    wherein the cyclic repetitive transmission scheme includes transmitting first data in a first symbol transmitted in the first half band and subsequently transmitting the first data in a second symbol transmitted in the second half band, a first basic bandwidth mode includes the first half band, and a second basic bandwidth mode includes the second half band, and
    wherein the in-symbol repetitive transmission scheme includes transmitting second data in a third symbol transmitted in the first half band and simultaneously transmitting the second data in a fourth symbol transmitted in the second half band, and a third basic bandwidth mode includes the first and second half bands.

2. The data transmission apparatus of claim 1, wherein the transmission unit divides the ½× bandwidth mode, the basic bandwidth mode, the 2× bandwidth mode, the 4× bandwidth mode, and the 8× bandwidth mode into sub-bands, classifies the sub-bands into primary channels and secondary channels, and transmits the data packets through the primary channels and the secondary channels.

3. The data transmission apparatus of claim 1, wherein the transmission unit transmits an L-SIG (legacy signal field), a VHT-SIG (very high throughput signal field) and a VHT-DATA included in the data packets, in the cyclic repetitive transmission scheme or the in-symbol repetitive transmission scheme.

4. The data transmission apparatus of claim 1, wherein the transmission unit transmits the data packets through changing codes or phases of the subcarriers, in the cyclic repetitive transmission scheme or the in-symbol repetitive transmission scheme.

5. The data transmission apparatus of claim 1, wherein the transmission unit transmits the data packets through subcarriers included in one half band of the first half band and the second half band of the basic frequency band in the ½× bandwidth mode.

6. The data transmission apparatus of claim 1, wherein
    the first half band includes upper subcarriers of the first basic bandwidth mode and the second half band includes lower subcarriers of a second basic bandwidth mode, or
    the first half band includes lower subcarriers of the first basic bandwidth mode and the second half band includes upper subcarriers of a second basic bandwidth mode.

7. A data transmitting method in a communication system, comprising:
    verifying a basic frequency band capable of being used for transmitting and receiving data packets to and from a plurality of terminals, and a multi-bandwidth mode in the basic frequency band;
    generating the data packets in the multi-bandwidth mode;
    transmitting the data packets in the multi-bandwidth mode through subcarriers of a first half band and a second half band, using one of a cyclic repetitive transmission scheme and an in-symbol repetitive transmission scheme,
    wherein the multi-bandwidth mode includes a ½× bandwidth mode of the basic frequency band, a basic bandwidth mode, a 2× bandwidth mode of the basic frequency band, a 4× bandwidth mode of the basic frequency band and an 8× bandwidth mode of the basic frequency band,
    wherein the cyclic repetitive transmission scheme includes transmitting first data in a first symbol transmitted in the first half band and subsequently transmitting the first data in a second symbol transmitted in the second half band, a first basic bandwidth mode includes the first half band, and a second basic bandwidth mode includes the second half band, and
    wherein the in-symbol repetitive transmission scheme includes transmitting second data in a third symbol transmitted in the first half band and simultaneously transmitting the second data in a fourth symbol transmitted in the second half band, and a third basic bandwidth mode includes the first and second half bands.

8. The method of claim 7, wherein said transmitting divides the ½× bandwidth mode, the basic bandwidth mode, the 2× bandwidth mode, the 4× bandwidth mode and the 8× bandwidth mode into sub-bands, classifies the sub-bands into primary channels and secondary channels, and transmits the data packets through the primary channels and the secondary channels.

9. The method of claim 7, wherein said transmitting transmits an L-SIG (legacy signal field), a VHT-SIG (very high throughput signal field) and a VHT-DATA included in the data packets, in the cyclic repetitive transmission scheme or the in-symbol repetitive transmission scheme.

10. The method of claim 7, wherein said transmitting transmits the data packets through changing codes or phases of the subcarriers, in the cyclic repetitive transmission scheme or the in-symbol repetitive transmission scheme.

11. The method of claim 7, wherein said transmitting transmits the data packets through subcarriers included in one half band of the first half band and the second half band of the basic frequency band in the ½× bandwidth mode.

12. The data transmitting method of claim 7, wherein
the first half band includes upper subcarriers of the first basic bandwidth mode and the second half band includes lower subcarriers of a second basic bandwidth mode, or
the first half band includes lower subcarriers of the first basic bandwidth mode and the second half band includes upper subcarriers of a second basic bandwidth mode.

13. A data reception apparatus in a communication system, comprising:
a reception unit configured to receive data packets in a multi-bandwidth mode in a basic frequency band capable of being used for transmitting and receiving the data packets to and from a plurality of terminals;
a verification unit configured to verify the multi-bandwidth mode from the data packets; and
a recovery unit configured to recover the data packets,
wherein the multi-bandwidth mode includes a ½× bandwidth mode of the basic frequency band, a basic bandwidth mode, a 2× bandwidth mode of the basic frequency band, a 4× bandwidth mode of the basic frequency band and an 8× bandwidth mode of the basic frequency band,
wherein the reception unit receives the data packets through subcarriers of a first half band and a second half band, using one of a cyclic repetitive transmission scheme and an in-symbol repetitive transmission scheme,
wherein the cyclic repetitive transmission scheme includes receiving first data in a first symbol transmitted in the first half band and subsequently receiving the first data in a second symbol transmitted in the second half band, a first basic bandwidth mode includes the first half band, and a second basic bandwidth mode includes the second half band, and
wherein the in-symbol repetitive transmission scheme includes receiving second data in a third symbol transmitted in the first half band and simultaneously receiving the second data in a fourth symbol transmitted in the second half band, wherein a third basic bandwidth mode includes the first and second half bands.

14. The data reception apparatus of claim 13, wherein the reception unit receives the data packets through subcarriers included in one half band of the first half band and the second half band of the basic frequency band in the ½× bandwidth mode.

15. The data reception apparatus of claim 13, wherein the verification unit verifies the multi-bandwidth mode using power of signals which are received through the subcarriers of the first half band and the second half band.

16. The data reception apparatus of claim 13, wherein
the first half band includes upper subcarriers of the first basic bandwidth mode and the second half band includes lower subcarriers of a second basic bandwidth mode, or
the first half band includes lower subcarriers of the first basic bandwidth mode and the second half band includes upper subcarriers of a second basic bandwidth mode.

17. A data receiving method in a communication system, comprising:
receiving data packets in a multi-bandwidth mode in a basic frequency band capable of being used for transmitting and receiving the data packets to and from a plurality of terminals, wherein said receiving receives the data packets through subcarriers of a first half band and a second half band, using one of a cyclic repetitive transmission scheme and an in-symbol repetitive transmission scheme;
verifying the multi-bandwidth mode from the data packets; and
recovering the data packets,
wherein the multi-bandwidth mode includes a ½× bandwidth mode of the basic frequency band, the basic bandwidth, a 2× bandwidth of the basic frequency band, a 4× bandwidth of the basic frequency band and an 8× bandwidth of the basic frequency band,
wherein the cyclic repetitive transmission scheme includes receiving first data in a first symbol transmitted in the first half band and subsequently receiving the first data in a second symbol transmitted in the second half band, wherein a first basic bandwidth mode includes the first half band, and a second basic bandwidth mode includes the second half band, and
wherein the in-symbol repetitive transmission scheme includes receiving second data in a third symbol transmitted in the first half band and simultaneously receiving the second data in a fourth symbol transmitted in the second half band, wherein a third basic bandwidth mode includes the first and second half bands.

18. The method of claim 17, wherein said receiving receives the data packets through subcarriers included in one half band of the first half band and the second half band of the basic frequency band in the ½× bandwidth.

19. The method of claim 17, wherein said verifying verifies the multi-bandwidth mode using power of signals which are received through the subcarriers of the first half band and the second half band in the basic frequency band.

20. The data receiving method of claim 17, wherein
the first half band includes upper subcarriers of the first basic bandwidth mode and the second half band includes lower subcarriers of a second basic bandwidth mode, or
the first half band includes lower subcarriers of the first basic bandwidth mode and the second half band includes upper subcarriers of a second basic bandwidth mode.

* * * * *